(12) United States Patent
Oshima

(10) Patent No.: US 11,320,642 B2
(45) Date of Patent: May 3, 2022

(54) INFORMATION PROCESSING APPARATUS, INFORMATION PROCESSING METHOD, AND INFORMATION PROCESSING PROGRAM

(71) Applicant: Sony Corporation, Tokyo (JP)

(72) Inventor: Takuya Oshima, Chiba (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 16/868,016

(22) Filed: May 6, 2020

(65) Prior Publication Data

US 2020/0264423 A1 Aug. 20, 2020

Related U.S. Application Data

(63) Continuation of application No. 14/769,916, filed as application No. PCT/JP2014/001258 on Mar. 6, 2014, now Pat. No. 10,678,041.

(30) Foreign Application Priority Data

Mar. 13, 2013 (JP) ................................ 2013-049946

(51) Int. Cl.
*G02B 21/36* (2006.01)
*G02B 7/34* (2021.01)
(Continued)

(52) U.S. Cl.
CPC ............ *G02B 21/367* (2013.01); *G02B 7/34* (2013.01); *G02B 7/36* (2013.01); *G02B 21/0016* (2013.01);
(Continued)

(58) Field of Classification Search
None
See application file for complete search history.

(56) References Cited

U.S. PATENT DOCUMENTS

2008/0137938 A1\* 6/2008 Zahniser .............. G02B 21/244
382/133
2008/0266440 A1 10/2008 Yazdanfar et al.
(Continued)

FOREIGN PATENT DOCUMENTS

EP 2023127 A1 2/2009
JP 03-258171 A 11/1991
(Continued)

OTHER PUBLICATIONS

International Search Report and Written Opinion and English translation thereof dated Jun. 17, 2014 in connection with International Application No. PCT/JP2014/001258.
(Continued)

*Primary Examiner* — James M Anderson, II
(74) *Attorney, Agent, or Firm* — Wolf, Greenfield & Sacks, P.C.

(57) ABSTRACT

This information processing apparatus includes: a search image acquisition unit that acquires enlarged images at focal positions different from each other; a first feature amount calculation unit that obtains, for each of the multiple captured enlarged images, a first feature amount based on a direct current component and a dynamic range of an alternating current component of pixel values for each of blocks forming each of the enlarged images; and an in-focus position determination unit that determines an in-focus position of each enlarged image based on the first feature amount.

17 Claims, 30 Drawing Sheets

Sample in HE staining

Partially enlarged

(51) Int. Cl.
*G02B 7/36* (2021.01)
*G02B 21/24* (2006.01)
*G02B 21/00* (2006.01)
*G02B 21/14* (2006.01)
*G02B 21/18* (2006.01)
*H04N 5/235* (2006.01)
*H04N 5/232* (2006.01)
*G03B 13/36* (2021.01)
*G06T 3/40* (2006.01)

(52) U.S. Cl.
CPC ............ *G02B 21/14* (2013.01); *G02B 21/18* (2013.01); *G02B 21/244* (2013.01); *G02B 21/245* (2013.01); *G03B 13/36* (2013.01); *G06T 3/40* (2013.01); *H04N 5/2354* (2013.01); *H04N 5/232122* (2018.08); *H04N 5/232123* (2018.08)

(56) References Cited

U.S. PATENT DOCUMENTS

| | | |
|---|---|---|
| 2008/0266652 A1 | 10/2008 | Yazdanfar et al. |
| 2009/0086314 A1* | 4/2009 | Namba ................. G02B 21/34 359/383 |
| 2009/0195688 A1 | 8/2009 | Henderson et al. |
| 2010/0182493 A1* | 7/2010 | Yuba ................ H04N 5/232123 348/348 |
| 2010/0208961 A1 | 8/2010 | Zahniser |
| 2011/0242418 A1 | 10/2011 | Hosokawa et al. |
| 2012/0007977 A1 | 1/2012 | Yamamoto et al. |
| 2015/0296193 A1 | 10/2015 | Cote et al. |
| 2016/0011409 A1 | 1/2016 | Oshima |

FOREIGN PATENT DOCUMENTS

| | | | |
|---|---|---|---|
| JP | 11-231228 | A | 8/1999 |
| JP | 3176650 | B2 * | 6/2001 |
| JP | 3176650 | B2 | 6/2001 |
| JP | 2007-086596 | A | 4/2007 |
| JP | 2009-059326 | A | 3/2009 |
| JP | 4332905 | B2 | 9/2009 |
| JP | 4332905 | B2 * | 9/2009 |
| JP | 2010-062204 | A | 3/2010 |
| JP | 2010-512545 | A | 4/2010 |
| JP | 2010-147546 | A | 7/2010 |
| JP | 2010147546 | A * | 7/2010 |
| JP | 2010-171565 | A | 8/2010 |
| JP | 2012-523583 | A | 10/2012 |
| JP | 2012-247604 | A | 12/2012 |
| JP | 2012247604 | A * | 12/2012 |
| JP | 5174589 | B2 * | 4/2013 |
| JP | 5174589 | B2 | 4/2013 |
| WO | WO 2007/139201 | A1 | 12/2007 |
| WO | WO 2008/134678 | A1 | 11/2008 |
| WO | WO 2008/134680 | A1 | 11/2008 |
| WO | WO 2010/120231 | A1 | 10/2010 |

OTHER PUBLICATIONS

International Preliminary Report on Patentability and English translation thereof dated Sep. 24, 2015 in connection with International Application No. PCT/JP2014/001258.
U.S. Appl. No. 14/769,916, filed Aug. 24, 2015, Oshima.
International Preliminary Report on Patentablility and English translation thereof dated Sep. 24, 2015 in connection with International Application No. PCT/JP2014/001258.

* cited by examiner

- Brenner Gradient (Square sum of adjacent difference value)
  $\Sigma (R_{i,j} - R_{i,j+m})^2$
- Dynamic range
  Maximum value - Minimum value
- Absolute value sum of adjacent difference value
  $\Sigma |R_{i,j} - R_{i,j+1}|$
- Square sum of absolute value of adjacent difference value
  $\Sigma |R_{i,j} - R_{i,j+1}|^{1/2}$

FIG.11

DC=1200, DR=250
Sample presence confirming threshold value=0xa00

| aa | 3f | 31 | 0 | 7a | 49 | 0 | 80 |
|---|---|---|---|---|---|---|---|
| a0 | 29 | 0 | 8 | ac | 8 | 33 | 74 |
| 0 | 0 | 18 | 10 | 6a | 8 | 231 | 2de |
| 222 | 40 | 0 | 18 | 51 | 4b | 0 | 2ba |
| 167 | 10 | 0 | 0 | 40 | 34d7 | 1d332 | 18f97 |
| d | 8 | 8 | 50 | 29 | 3de6 | 4ad9 | 35a |

FIG.16

DC=1200, DR=250
Sample presence confirming threshold value=0xa00

| | | | | | |
|---|---|---|---|---|---|
| 9e | 20 | 20 | 199 | 37 | 0 |
| 3b | 0 | 10 | 0 | 0 | 0 |
| 0 | 21 | 0 | 18 | 65 | 61 |
| 0 | 0 | 19a | 20 | b9 | 5c |
| 0 | 0 | b7 | 57 | a0 | 9fbc |
| 0 | 188 | 210 | 181 | 84 | 1ce73 |
| 525 | 74b | 506 | 4e | 0 | ec26 |
| 4f4 | 638 | 28c | 294 | 78 | 17f32 |

FIG.18

DC=1200, DR=250
Sample presence confirming threshold value=0xa00

| 0 | 49 | 7a | 0 | 31 | 3f | aa |
|---|----|----|---|----|----|----|
|   |    |    |   |    |    | a0 |
|   |    |    |   |    |    | 0  |
|   |    |    |   |    |    | 222|
|   |    |    |   |    |    | 167|
|   |    |    |   |    |    | d  |
|   |    |    |   |    | 8  |    |
|   |    |    |   |    | 8  |    |
|   |    |    |   |    | 50 |    |
|   |    |    |   |    | 29 |    |
|   |    |    |   |    | 3de6 | |
|   |    |    |   |    | 4ad9 | |
| 80 | 74 | 2de | 2ba | 18f97 | 35a | |

DC=1200, DR=250
Sample presence confirming threshold value=0xa00

| 4f4 | 525 | 0 | 0 | 0 | 0 | 3b | 9e |
|---|---|---|---|---|---|---|---|
| 638 | | | | | | | 20 |
| 28c | | | | | | | 20 |
| 294 | | | | | | | 199 |
| 78 | | | | | | | 37 |
| 17f32 | ec26 | 1ce73 | 9fbc | 5c | 61 | 0 | 0 |

INFORMATION PROCESSING APPARATUS, INFORMATION PROCESSING METHOD, AND INFORMATION PROCESSING PROGRAM

CROSS-REFERENCE TO RELATED APPLICATIONS

The present application claims the benefit under 35 U.S.C. § 120 as a continuation application of U.S. application Ser. No. 14/769,916, filed on Aug. 24, 2015, now U.S. Pat. No. 10,678,041, which is a National Stage of International Application No. PCT/JP2014/001258, filed in the Japanese Patent Office as a Receiving office on Mar. 6, 2014, which claims priority to Japanese Patent Application Number 2013-049946, filed in the Japanese Patent Office on Mar. 13, 2013, each of which is hereby incorporated by reference in its entirety.

TECHNICAL FIELD

The present technology relates to a digital microscope apparatus that photographs a preparation on which a sample is placed, to acquire images.

BACKGROUND ART

There are digital microscope apparatuses and viewers that use a microscope apparatus for observing a cellular tissue slide (preparation) to store slide information as digital images and perform a pathological diagnosis and the like using image data of the digital images.

The digital microscope apparatus enlarges the cellular tissue slide using an enlarging optical system to project the cellular tissue slide on an image sensor, takes images, and stitches (combines) a plurality of images, to form a single huge sample image.

At that time, since the depth of field of the microscope apparatus is very shallow (approximately 1 µm), in the case where a thick cellular tissue is photographed, photographing should be performed at a position (Z position), in an optical axis direction, at which an in-focus state becomes the best. Since the cellular tissue on the slide has irregular waves, an optimal focal position differs depending on the parts of the cellular tissue. Therefore, it is ideal to adjust a focal position each time photographing is performed.

The digital microscope apparatuses include, in order to automatically adjust a focal position, microscope apparatuses that adopt a contrast autofocusing (hereinafter, abbreviated to AF) system and microscope apparatuses that adopt a phase difference AF system.

For example, an AF system shown in Patent Document 1 is characterized by using, when a point at which contrast becomes the maximum is searched for, a difference between the last contrast value and a current contrast value to set the magnitude of the difference as a threshold value, and specifying an in-focus position using the threshold value. Further, in an AF system shown in Patent Document 2, the definition of a feature amount representing contrast includes hue information. In an AF system shown in Patent Document 3, the definition of a feature amount representing contrast adopts the amount of high-pass components.

Patent Document 1: Japanese Patent Application Laid-open No. 2007-86596
Patent Document 2: Japanese Patent Application Laid-open No. 2009-59326
Patent Document 3: Japanese Patent Application Laid-open No. Hei 03-258171

SUMMARY OF INVENTION

Problem to be Solved by the Invention

In the microscope apparatuses that adopt the contrast AF system, photographing for search and contrast comparison are repeated until an in-focus position is determined by the peak of contrast in images taken for search. Thus, it takes a lot of time to adjust the focal position.

For that reason, in practical use, it is not realistic to perform photographing while adjusting the focal position at each photographing position in each photographing. In this regard, used is a photographing system in which focal positions are previously searched for at selected representative points, to estimate a focal position at each point of a photographing area based on the results of the search.

In the case of using this photographing system, errors are generated, for example, errors from an optimal in-focus position that are generated at respective photographing positions due to the estimation using the representative points, and errors generated due to thermal expansion and the like associated with a temperature change because time is required from previous measurements at the representative points to actual photographing at respective photographing positions. Therefore, an in-focus state at each photographing position becomes uncertain.

The contrast AF system is thought to be highly accurate, but it takes quite a long time as described above, if the photographing for search and the confirmation of contrast are sequentially repeated. Therefore, it is known a method to suppress the number of times the photographing for search is performed, to the minimum, and estimate an in-focus position using curve fitting.

In the past in-focus position estimation using the curve fitting, a feature amount having the following property has been used: the value increases as a focus is gradually obtained. For example, a method of using a Brenner Gradient, a sum of differences of adjacent pixels, is well known.

Further, in order to limit a notable part of an image, a method of selecting a feature by spatial frequencies using a high-pass filter or a low-pass filter has been used.

In those methods, it is thought that a curve obtained by plotting feature amounts shows a feature similar to Lorentz function in the vicinity of the in-focus position, and thus using reciprocals thereof can provide curve fitting as a simple quadratic function.

Actually, however, the curve does not show features as the Lorentz function in many cases, for example, in the case where the sample occupies only half the area or less of a photographing area on the preparation, in the case where staining is weak due to the type of staining and features are not made clear, and in the case where more features are found in dust. Thus, the digital microscope apparatus has been capable of being used only under conditions that the types of samples and staining are really limited. In particular, in the case where the NA (numerical aperture) is increased so as to increase a resolution, this problem becomes prominent.

On the other hand, in the case where the phase difference AF system is adopted, an in-focus speed is rapid, but depending on the types of staining of a sample, feature differences in images may not be grasped with an imaging device of a low resolution for the phase difference AF in some cases. In such cases, there are problems that the in-focus position cannot be correctly obtained.

As a hybrid AF system, there is also a digital microscope apparatus that uses both the two AF systems described above in combination. In this system, a method is found in which the in-focus positions calculated by the two AF systems are compared (specifically, by confirming whether a difference value is smaller than a predetermined threshold value or not), to obtain the certainty of the in-focus positions. However, a good result is not always obtained by comparing the in-focus positions of low accuracy. In the case where a target incompatible with the two systems is photographed, there is a problem that the two systems have a high possibility of determining that the target is in focus, in spite of being out of focus.

Further, as another problem, in order to shorten the overall time to acquire images as much as possible, there is another method in which an overhead image is taken first, an area in which a sample exists is detected in advance by using the overhead image, and actual photographing is performed on only the area in which the sample exists.

However, since the overhead image is taken at a low resolution, it is impossible to detect all parts of the sample. Therefore, this method has a problem that parts that are left non-photographed are inevitably generated in the actual photographing.

In contrast to the generation of the non-photographed parts, there is also a problem that a part including no sample or a dust part on the surface of the preparation is erroneously detected as a part in which the sample exists, and useless actual photographing is performed. This problem leads to problems of an increase in photographing time and the bloating of final sample images.

As described above, in the past, there have been no digital microscope apparatuses that obtain an appropriate in-focus position at high speed and efficiently perform photographing.

In view of the circumstances as described above, it is an object of the present technology to provide an information processing apparatus, an information processing method, and an information processing program for obtaining an appropriate in-focus position at high speed and efficiently performing photographing.

Means for Solving the Problem

To achieve the object described above, according to an embodiment of the present technology, there is provided an information processing apparatus including: a search image acquisition unit that acquires enlarged images at focal positions different from each other; a first feature amount calculation unit that obtains, for each of the multiple captured enlarged images, a first feature amount based on a direct current component and a dynamic range of an alternating current component of pixel values for each of blocks forming each of the enlarged images; and an in-focus position determination unit that determines an in-focus position of each enlarged image based on the first feature amount.

In the present technology, in order to obtain a feature amount of contrast of a taken image, an alternating current component and a direct current component of pixel values are obtained in a block including adjacent pixels having the same color (for example, block being series of eight pixels having the same color) instead of using, for example, a Brenner Gradient used in the past. The dynamic range of the alternating current component and the direct current component are then subjected to filtering by a threshold value, a predetermined unit feature amount is obtained for only a block having a dynamic range and a direct current component that meet a condition, and an in-focus position when an image is taken is obtained based on a first feature amount, the first feature amount being a value of the sum of unit feature amounts of one image. Therefore, the in-focus position can be obtained with high accuracy.

The first feature amount calculation unit may obtain the first feature amount in accordance with the block that satisfies a first condition in which the dynamic range of the alternating current component is predetermined and a second condition in which the direct current component is predetermined.

The first feature amount calculation unit may calculate and combine a unit feature amount of the block that satisfies the first condition and the second condition by a predetermined method, and obtain a first feature amount of each of the enlarged images based on a result of the combination.

The information processing apparatus may further include a curve fitting unit that performs curve fitting on a predetermined curve based on a combination of reciprocals of the first feature amounts at three or more focal positions and calculates a focal position at which the reciprocal becomes minimum on the predetermined curve, in which the in-focus position determination unit may set the focal position calculated by the curve fitting unit as an in-focus position.

The predetermined curve may be a quadratic curve.

The first feature amount calculation unit may calculate the first feature amount based on a minimum value and a difference value between a maximum value and the minimum value of pixel values of each block.

The first feature amount calculation unit may use the dynamic range as the unit feature amount.

The search image acquisition unit may acquire rough-search enlarged images at three or more focal positions that are separated from one another by a first interval for roughly searching for an in-focus position, the first feature amount calculation unit may obtain the first feature amount for each of the rough-search enlarged images, the in-focus position determination unit may obtain an in-focus position for rough search, the search image acquisition unit may acquire fine-search enlarged images at three or more focal positions that are separated from one another by a second interval for finely searching for an in-focus position with the in-focus position for rough search being set as the center, the second interval being narrower than the first interval, the first feature amount calculation unit may obtain the first feature amount for each of the fine-search enlarged images, and the in-focus position determination unit may obtain an in-focus position for fine search and set the in-focus position for fine search as a final in-focus position.

The search image acquisition unit may acquire the enlarged images at three or more focal positions different from one another, the first feature amount calculation unit may partition each of the multiple acquired enlarged images into m×n first areas, m and n being integers of 2 or more, and obtain the first feature amount for each of the first areas, and the in-focus position determination unit may obtain an in-focus position for each of the first areas, obtain a tilt of the sample from the in-focus position for each of the areas, and select a final in-focus position based on the tilt.

The first feature amount calculation unit may obtain, when the result of the combination is smaller than a predetermined value, a Brenner Gradient of each of the enlarged images and add the Brenner Gradient to the result of the combination, to obtain the first feature amount.

The information processing apparatus may further include a phase difference autofocusing (AF) processing unit that causes a phase difference AF detection unit to detect a phase difference in-focus position, the phase difference AF detection unit detecting an in-focus position by a phase difference AF system, in which the search image acquisition unit may acquire the enlarged images at three or more focal positions different from one another, the phase difference in-focus position being located among the three or more focal positions.

The in-focus position determination unit may set the phase difference in-focus position as a final in-focus position, when at least one of that the first feature amount at the phase difference in-focus position is the maximum and that a reciprocal of the first feature amount at the focal position satisfies a predetermined relationship is satisfied.

The information processing apparatus may further include: a phase difference AF processing unit that causes a phase difference AF detection unit to detect a phase difference in-focus position, the phase difference AF detection unit detecting an in-focus position by a phase difference AF system; and an enlarged image capturing unit that captures enlarged images of multiples small areas that partition an area including a sample on a glass slide, in which the search image acquisition unit may acquire rough-search enlarged images at three or more focal positions that are separated from one another by a first interval for roughly searching for an in-focus position, in a first small area of the multiples small areas, the first feature amount calculation unit may obtain the first feature amount for each of the rough-search enlarged images, the in-focus position determination unit may obtain an in-focus position for rough search, the search image acquisition unit may acquire fine-search enlarged images at three or more focal positions that are separated from one another by a second interval for finely searching for an in-focus position with the in-focus position for rough search being set as the center, the second interval being narrower than the first interval, the first feature amount calculation unit may obtain the first feature amount for each of the fine-search enlarged images, the in-focus position determination unit may obtain an in-focus position for fine search and set the in-focus position for fine search as a final in-focus position, the phase difference AF processing unit may calculate the phase difference in-focus position of each of second small areas, the second small areas being one or more small areas included in the multiple small areas excluding the first small area, the search image acquisition unit may acquire the enlarged images at three or more focal positions different from one another, the phase difference in-focus position being located among the three or more focal positions, the first feature amount calculation unit may obtain the first feature amount for each of the enlarged images, and the in-focus position determination unit may set the phase difference in-focus position as a final in-focus position, when at least one of that the first feature amount at the phase difference in-focus position is the maximum and that the focal position and a reciprocal of the first feature amount satisfy a predetermined relationship is satisfied.

The first feature amount calculation unit may set, when the first feature amount for each of the rough-search enlarged images is obtained, the first condition in which the first feature amount exceeds a square root value of the maximum value that is output by the enlarged image capturing unit.

The information processing apparatus may further include: a second feature amount calculation unit that partitions each of the enlarged images into p×q second areas, p and q being predetermined positive integers, obtains, for each of the second areas, a direct current component and a dynamic range of an alternating current component of pixel values for each of blocks forming the second area, counts blocks that satisfy a first condition in which the dynamic range of the alternating current component is predetermined and a second condition in which the direct current component is predetermined, and obtains a result of the count as a second feature amount for each of the second areas; and a white image determination unit that determines the enlarged image as a white image in which a sample does not appear, if there is no second feature amount exceeding a predetermined value in the obtained second feature amounts.

The information processing apparatus may further include: an enlarged image capturing unit that captures enlarged images of multiples small areas that partition an area including a sample on a glass slide; a second feature amount calculation unit that partitions a peripheral part of each of the enlarged images into p second areas, p being a predetermined integer of 2 or more, obtains, for each of the second areas, a direct current component and a dynamic range of an alternating current component of pixel values for each of blocks forming the second area, counts blocks that satisfy a first condition in which the dynamic range of the alternating current component is predetermined and a second condition in which the direct current component is predetermined, and obtains a result of the count as a second feature amount for each of the second areas; and a continuation determination unit that determines the enlarged image of a different small area adjacent to the second area as an image in which the sample appears, when the obtained second feature amount exceeds a predetermined value.

To achieve the object described above, according to an embodiment of the present technology, there is provided an information processing method including: acquiring, by a search image acquisition unit, enlarged images at focal positions different from each other; obtaining, by a first feature amount calculation unit, for each of the multiple captured enlarged images, a first feature amount based on a direct current component and a dynamic range of an alternating current component of pixel values for each of blocks forming each of the enlarged images; and determining, by an in-focus position determination unit, an in-focus position of each enlarged image based on the first feature amount.

To achieve the object described above, according to an embodiment of the present technology, there is provided an information processing program causing a computer to function as: a search image acquisition unit that acquires enlarged images at focal positions different from each other; a first feature amount calculation unit that obtains, for each of the multiple captured enlarged images, a first feature amount based on a direct current component and a dynamic range of an alternating current component of pixel values for each of blocks forming each of the enlarged images; and an in-focus position determination unit that determines an in-focus position of each enlarged image based on the first feature amount.

Effect of the Invention

As described above, according to the present technology, it is possible to obtain an appropriate in-focus position at high speed and efficiently perform photographing.

BRIEF DESCRIPTION OF DRAWINGS

FIG. 11 is a diagram showing examples of a value that can be adopted as the first feature amount H.

FIG. 16 is a diagram showing a state where second feature amounts E for respective areas are calculated for the image of the sample SPL subjected to HE staining (hematoxylin-eosin staining) shown in FIG. 15 by the white determination processing.

FIG. 18 is a diagram showing a state where second feature amounts E for respective areas are calculated for the image of the different sample SPL subjected to the HE staining shown in FIG. 17 by the white determination processing.

FIG. 20 is a diagram showing a state where the second feature amounts E for respective areas are calculated for the image of the sample SPL shown in FIG. 15 by the continuation determination processing.

FIG. 21 is a diagram showing a state where the second feature amounts E for respective areas are calculated for the image of the different sample SPL shown in FIG. 17 by the continuation determination processing.

MODE(S) FOR CARRYING OUT THE INVENTION

Hereinafter, embodiments of the present technology will be described with reference to the drawings.

First Embodiment

Figure 1:
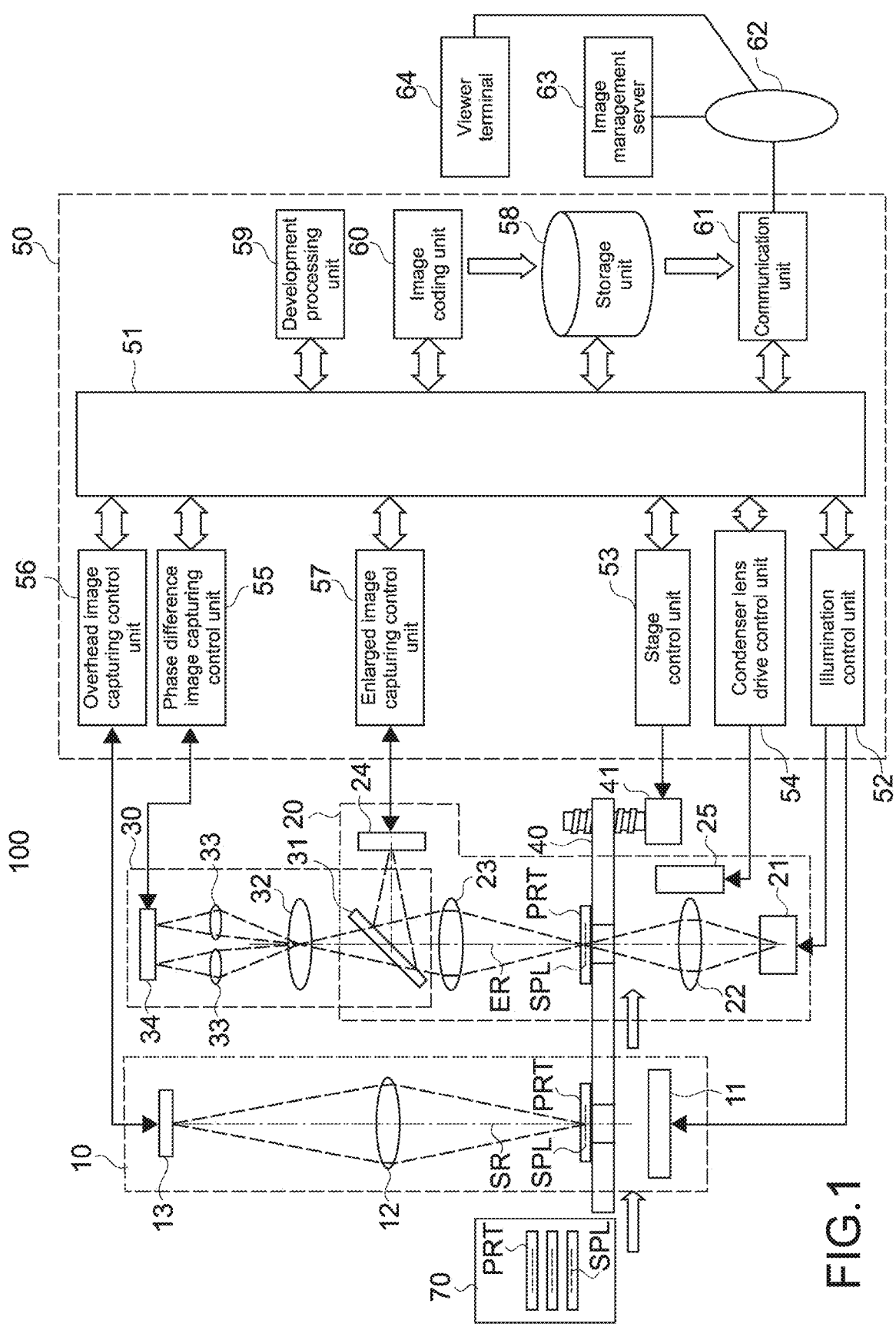
FIG. 1 is a functional block diagram showing the overall configuration of a digital microscope apparatus 100 according to this embodiment.

FIG. 1 is a block diagram showing the overall configuration of a digital microscope apparatus 100 according to this embodiment.

(Overall Configuration)

The digital microscope apparatus 100 includes an overhead image capturing unit 10, an enlarged image capturing unit 20, a defocus amount detection unit 30, a stage 40, and a control unit 50.

The overhead image capturing unit 10 captures an image of the entire preparation PRT on which a biological sample SPL is disposed (the image is hereinafter called "overhead image").

The enlarged image capturing unit 20 captures an image obtained by enlarging the biological sample SPL at a predetermined magnification (the image is hereinafter called "enlarged image").

The defocus amount detection unit 30 detects, as a defocus amount, the amount and orientation of a displacement in an optical axis direction between a focal point of an objective lens 23 of the enlarged image capturing unit 20 and the biological sample SPL on the preparation PRT.

The stage 40 is for moving the preparation PRT placed thereon to a position for imaging by the overhead image capturing unit 10 and a position for imaging by the enlarged image capturing unit 20. The stage 40 is configured to be movable by a stage drive mechanism 41 in a direction of an optical axis (Z-axis direction) of the objective lens 23 of the enlarged image capturing unit 20 and also in a direction (X- and Y-axis directions) orthogonal to the direction of the optical axis.

It should be noted that the preparation PRT is obtained by fixing the biological sample SPL to a glass slide by a predetermined fixing technique. The biological sample SPL includes tissue slices of connective tissues such as blood, epithelial tissues, tissues including both of the above tissues, or the like, or includes smear cells. Those tissue slices or smear cells are subjected to various types of staining as necessary. Examples of staining include not only general staining represented by HE (hematoxylin-eosin) staining, Giemsa staining, Papanicolaou staining, Ziehl-Neelsen staining, and Gram staining but also fluorescent staining such as FISH (Fluorescence In-Situ Hybridization) and an enzyme antibody technique.

The digital microscope apparatus 100 is additionally provided with a preparation stock loader 70 that stores the preparations PRT each containing the sample SPL and loads the stored preparations PRT one by one onto the stage 40. It should be noted that the preparation stock loader 70 may be integrated into the digital microscope apparatus 100.

Next, description will be given on the overhead image capturing unit 10, the enlarged image capturing unit 20, and the defocus amount detection unit 30 in detail.

[Overhead Image Capturing Unit 10]

The overhead image capturing unit 10 includes a light source 11, an objective lens 12, and an imaging device 13 as shown in the figure.

The light source 11 is provided on the side of a surface of the stage 40, the surface being opposite to a preparation arrangement surface.

The overhead image capturing unit 10 may be separately provided with a label light source (not shown). The label light source applies light for imaging supplementary information that is described on a label attached to the preparation PRT.

The objective lens 12 is disposed on the side of a surface of the stage 40, on which the preparation PRT is arranged, with the normal line of a reference position of the overhead image capturing unit 10 on the preparation PRT arrangement surface being set as an optical axis SR. Transmitted light that has been transmitted through the preparation PRT placed on the stage 40 is collected by the objective lens 12, to form an image onto the imaging device 13 that is provided behind the objective lens 12 (that is, in a traveling direction of illumination light).

Light in a photographing range in which the entire preparation PRT placed on the preparation arrangement surface of the stage 40 is included (in other words, transmitted light that has been transmitted through the entire preparation PRT) forms an image onto the imaging device 13. The image formed onto the imaging device 13 serves as an overhead image that is a microscope image obtained by imaging the entire preparation PRT.

[Enlarged Image Capturing Unit]

As shown in the figure, the enlarged image capturing unit 20 includes a light source 21, a condenser lens 22, the objective lens 23, an imaging device 24, and a condenser lens drive mechanism 25.

The light source 21 is for applying bright field illumination light. The light source 21 is provided on the side of the surface of the stage 40, the surface being opposite to the preparation arrangement surface.

The condenser lens 22 is a lens that collects light, the light being applied from the light source 21 or applied from the light source of the bright field illumination light, to guide the light to the preparation PRT on the stage 40. The condenser lens 22 is disposed between the light source 21 and the stage 40, with the normal line of a reference position of the enlarged image capturing unit 20 on the preparation PRT arrangement surface being as an optical axis ER.

The condenser lens drive mechanism 25 changes the position of the condenser lens 22 on the optical axis ER by driving the condenser lens 22 along a direction of the optical axis ER.

The objective lens 23 is disposed on the side of the preparation PRT arrangement surface of the stage 40, with the normal line of the reference position of the enlarged image capturing unit 20 on the preparation PRT arrangement surface being as the optical axis ER. In the enlarged image capturing unit 20, the objective lens 23 is appropriately replaced, and thus the biological sample SPL can be imaged in an enlarged form at various magnifications. Transmitted light that has been transmitted through the preparation PRT placed on the stage 40 is collected by the objective lens 23, to form an image onto the imaging device 24 that is provided behind the objective lens 23 (that is, in a traveling direction of the illumination light).

A beam splitter 31 is provided on the optical axis ER between the objective lens 23 and the imaging device 24. The beam splitter 31 guides part of the transmitted light that has been transmitted through the objective lens 23 to the defocus amount detection unit 30.

On the imaging device 24, an image of a photographing range (hereinafter, called small area) is formed. The photographing range is formed by predetermined horizontal and vertical widths on the preparation PRT arrangement surface of the stage 40 in accordance with the pixel size of the imaging device 24 and the magnification of the objective lens 23. It should be noted that the objective lens 23 enlarges part of the biological sample SPL, and thus the photographing range described above becomes a sufficiently narrower range than the photographing range of the imaging device 13.

[Defocus Amount Detection Unit]

As shown in the figure, the defocus amount detection unit 30 includes the beam splitter 31, a field lens 32, separator lenses 33, and an imaging device 34.

As described above, the beam splitter 31 is provided on the optical axis ER between the objective lens 23 and the imaging device 24 of the enlarged image capturing unit 20, and reflects part of the transmitted light that has been transmitted through the objective lens 23. In other words, the light that has been transmitted through the objective lens 23 is split by the beam splitter 31 into reflected light toward the imaging device 24 and transmitted light toward the field lens 32 in the defocus amount detection unit 30.

The field lens 32 is provided on a traveling direction side of the transmitted light split by the beam splitter 31. The field lens 32 collects the transmitted light that has been split by the beam splitter 31 and guides the transmitted light to the separator lenses 33 that are provided behind the field lens 32 (on a traveling direction side of the transmitted light).

The separator lenses 33 divide the light beam guided from the field lens 32 into two light beams. The divided light beams form a set of subject images on an image-forming surface of the imaging device 34 provided behind the separator lenses 33 (on the traveling direction side of the transmitted light).

On the imaging device 34, the images of the light beams that have been transmitted through the separator lenses 33 are formed. As a result, a set of subject images is formed on the imaging surface of the imaging device 34. Although the light beams that have been transmitted through the two separator lenses 33 are here assumed to be imaged in the single imaging device 34, the light beams that have been transmitted through the separator lenses 33 may be imaged by two imaging devices 34, respectively. Since light beams having various directions, which are emitted from the field lens 32, enter the separator lenses 33, a phase difference exists between the set of formed subject images. In the following description, the set of subject images is called "phase difference images".

It should be noted that the beam splitter 31 is provided between the objective lens 23 and the imaging device 24 in the above description, but a light beam branching means that branches a light beam is not limited to the beam splitter. A movable mirror or the like may be used. Further, a mechanism to switch between a lens barrel of the enlarged image capturing unit 20 and a lens barrel of the defocus amount detection unit 30 can be used.

Further, in the description described above, the configuration including the field lens 32, the separator lenses 33, and the imaging device 34 is shown as a phase difference AF (Autofocusing) optical system in the defocus amount detection unit 30, but the phase difference AF optical system is not limited to such an example. Such a phase difference AF optical system may be a different one as long as equivalent functions can be achieved by using a condenser lens and twin lenses instead of the field lens and the separator lenses, for example.

Furthermore, each of the imaging devices provided to the overhead image capturing unit 10, the enlarged image capturing unit 20, and the defocus amount detection unit 30 may be a one-dimensional imaging device or a two-dimensional imaging device.

[Control Unit 50]

The control unit 50 includes an integration control unit 51, an illumination control unit 52, a stage control unit 53, a condenser lens drive control unit 54, a phase difference image capturing control unit (phase difference AF detection unit) 55, an overhead image capturing control unit 56, an enlarged image capturing control unit (enlarged image capturing unit) 57, a storage unit 58, a development processing unit 59, and an image coding unit 60.

The illumination control unit 52 controls the application of the light sources 11 and 21 according to an instruction on an illumination method for the biological sample SPL. The instruction is given from the integration control unit 51. For example, the illumination control unit 52 selects the intensity of illumination light of the light sources 11 and 21 according to the instruction from the integration control unit 51, for example.

For example, when receiving an instruction to capture an overhead image from the integration control unit 51, the stage control unit 53 drives the stage drive mechanism 41 to move the stage 40 in a stage surface direction (in X- and Y-axis directions) such that the entire preparation PRT falls within the photographing range of the imaging device 13. The stage control unit 53 drives the stage drive mechanism 41 to move the stage 40 in the Z-axis direction such that the objective lens 12 comes into focus on the entire preparation PRT.

Further, when receiving an instruction to capture an enlarged image from the integration control unit 51, the stage control unit 53 drives the stage drive mechanism 41 to move the stage 40 in the stage surface direction (in X- and Y-axis directions) such that the instructed photographing range (small area) of the sample SPL falls within the photographing range of the imaging device 24. The stage control unit 53 drives the stage drive mechanism 41 to move the stage 40 in the Z-axis direction such that the objective lens 23 comes into focus on the sample SPL.

The condenser lens drive control unit 54 controls the condenser lens drive mechanism 25 based on information on the amount of defocus of an illumination field stop from the integration control unit 51, to adjust the illumination light from the light source 21 so as to be applied to only an observation range of the sample SPL. The information on the illumination field stop includes the amount of defocus and the orientation of defocus. Those pieces of information are obtained based on a distance between the set of phase difference images generated by the defocus amount detection unit 30.

The phase difference image capturing control unit 55 acquires signals of the set of phase difference images that are formed on the image-forming surface of the imaging device 34 provided to the defocus amount detection unit 30, and supplies the signals to the integration control unit 51. The integration control unit 51 calculates the amount of defocus and the orientation of defocus of the focal point of the objective lens 23 of the enlarged image capturing unit 20 with respect to the sample SPL, based on the distance between the set of phase difference images that are acquired from the phase difference image capturing control unit 55, according to a program loaded in a main memory of the integration control unit 51.

Based on those pieces of information, the integration control unit 51 generates control information for the stage 40 and supplies the control information to the stage control unit 53. The stage control unit 53 drives the stage drive mechanism 41 to move the stage 40 in the Z-axis direction based on the control information from the integration control unit 51. Consequently, the phase difference AF in which the objective lens 23 of the enlarged image capturing unit 20 comes into focus on the sample SPL is performed.

Based on a signal corresponding to the overhead image formed on the image-forming surface of the imaging device 13 of the overhead image capturing unit 10, the overhead image capturing control unit 56 generates data corresponding to the overhead image and supplies the data to the integration control unit 51. The integration control unit 51 performs, according to a program loaded in the main memory thereof, processing to specify an area, in which the sample SPL exists, from the overhead image acquired from the overhead image capturing control unit 56, for example.

The enlarged image capturing control unit 57 generates, based on a signal corresponding to the enlarged image of each photographing range (small area) that is formed on the image-forming surface of the imaging device 24 of the enlarged image capturing unit 20, data corresponding to the enlarged image and supplies the data to the integration control unit 51.

The integration control unit 51 supplies, according to a program loaded in the main memory thereof, the enlarged image as RAW data of each photographing range (small area), which has been acquired from the enlarged image capturing control unit 57, to the development processing unit 59 such that the development unit 59 executes development processing. The integration control unit 51 performs stitching processing to connect the pieces of the data of the developed enlarged images of the respective photographing ranges (small areas) to be an enlarged image on a sample SPL basis, processing to divide the thus-generated enlarged image on a sample SPL basis in a predetermined resolution unit, the predetermined resolution unit being called a tile, and other processing.

Further, the integration control unit 51 supplies each of the tiles generated by division to the image coding unit 60 such that the image coding unit 60 generates image data in a predetermined compression coding format and causes the storage unit 58 to store the image data.

The storage unit 58 stores programs or information such as various types of setting information for controlling the digital microscope apparatus 100, and the like. Further, the storage unit 58 stores the enlarged images of the sample SPL acquired by the digital microscope apparatus 100 in a predetermined resolution unit that is called a tile.

The development processing unit 59 develops the enlarged image as RAW data of each photographing range (small area) imaged by the enlarged image capturing unit 20. The developed enlarged images of the respective photographing ranges (small areas) are connected so as to be an enlarged image on a sample SPL basis by the integration control unit 51. The connected enlarged image on a sample SPL basis is divided in a predetermined resolution unit called a tile and supplied to the image coding unit 60.

The image coding unit 60 codes the images of respective tiles in the predetermined image compression format. Here, for example, JPEG (Joint Photographic Experts Group) is adopted as the image compression format. As a matter of course, compression coding formats other than JPEG may be adopted. The image data on a tile basis, which is compression-coded by the image coding unit 60, is stored in the storage unit 58.

The enlarged images in the form of tiles stored in the storage unit 58 are accumulated in an image management server 63 by the communication unit 61 through a network 62. In response to a request from a viewer terminal 64, the image management server 63 sends one or more appropriate enlarged images on a tile basis to the viewer terminal 64. The viewer terminal 64 generates an enlarged image for display by using the one or more enlarged images on a tile basis acquired from the image management server 63, and displays the enlarged image on a display of the viewer terminal 64.

(Autofocusing of Objective Lens of Enlarged Image Capturing Unit)

In the digital microscope apparatus 100 according to this embodiment, a phase difference autofocusing system and a contrast autofocusing system are implemented as autofocusing systems of the objective lens 23 of the enlarged image capturing unit 20. In this embodiment, in order to obtain an in-focus position, the phase difference autofocusing system and the contrast autofocusing system using a CMOS imager for the imaging device 24 of the enlarged image capturing unit 20 are combined to achieve a high-speed and accurate hybrid autofocusing system.

In the case where the phase difference autofocusing system is used, the integration control unit 51 instructs the phase difference image capturing control unit 55 to capture phase difference images. When receiving the instruction, the phase difference image capturing control unit 55 takes in signals of a set of phase difference images that are formed side by side on the imaging surface of the imaging device 34 from the defocus amount detection unit 30, and obtains a phase difference between the two phase difference images.

Here, when the focal point of the objective lens 23 moves further away from an appropriate surface, identical areas of observed surfaces on the two phase difference images move so as to be separated from each other toward the outward direction of the imaging device 24. Conversely, when the focal point of the objective lens 23 comes closer than the appropriate surface, the identical areas of the observed surfaces on the two phase difference images move so as to be close to each other toward the inward direction of the imaging device 24. The integration control unit 51 obtains, as the phase difference described above, a distance between the identical areas of the observed surfaces on the two phase difference images.

The integration control unit 51 obtains, based on the obtained phase difference, the amount of defocus and the orientation of defocus of the focal point of the objective lens 23 with respect to the sample SPL to be observed. The integration control unit 51 generates control information for the stage 40 based on the obtained amount and orientation of defocus and supplies the control information to the stage control unit 53. The stage control unit 53 drives the stage drive mechanism 41 to move the stage 40 in the Z-axis direction based on the control information from the integration control unit 51. Consequently, the phase difference autofocusing in which the objective lens 23 of the enlarged image capturing unit 20 comes into focus on the sample SPL is performed.

On the other hand, the contrast autofocusing system is a system in which a focal position is searched for in a hill climbing system by use of the enlarged image capturing unit 20. In the case of using the contrast autofocusing system, the integration control unit 51 displaces the focal position of the objective lens 23 by a predetermined distance and causes the enlarged image capturing unit 20 to image the photographing range of the sample SPL at respective focal positions. The integration control unit 51 determines a focal position when an image having a highest contrast in the captured images is captured, as an optimal focal position.

[Regarding Integration Control Unit 51]

Figure 2:
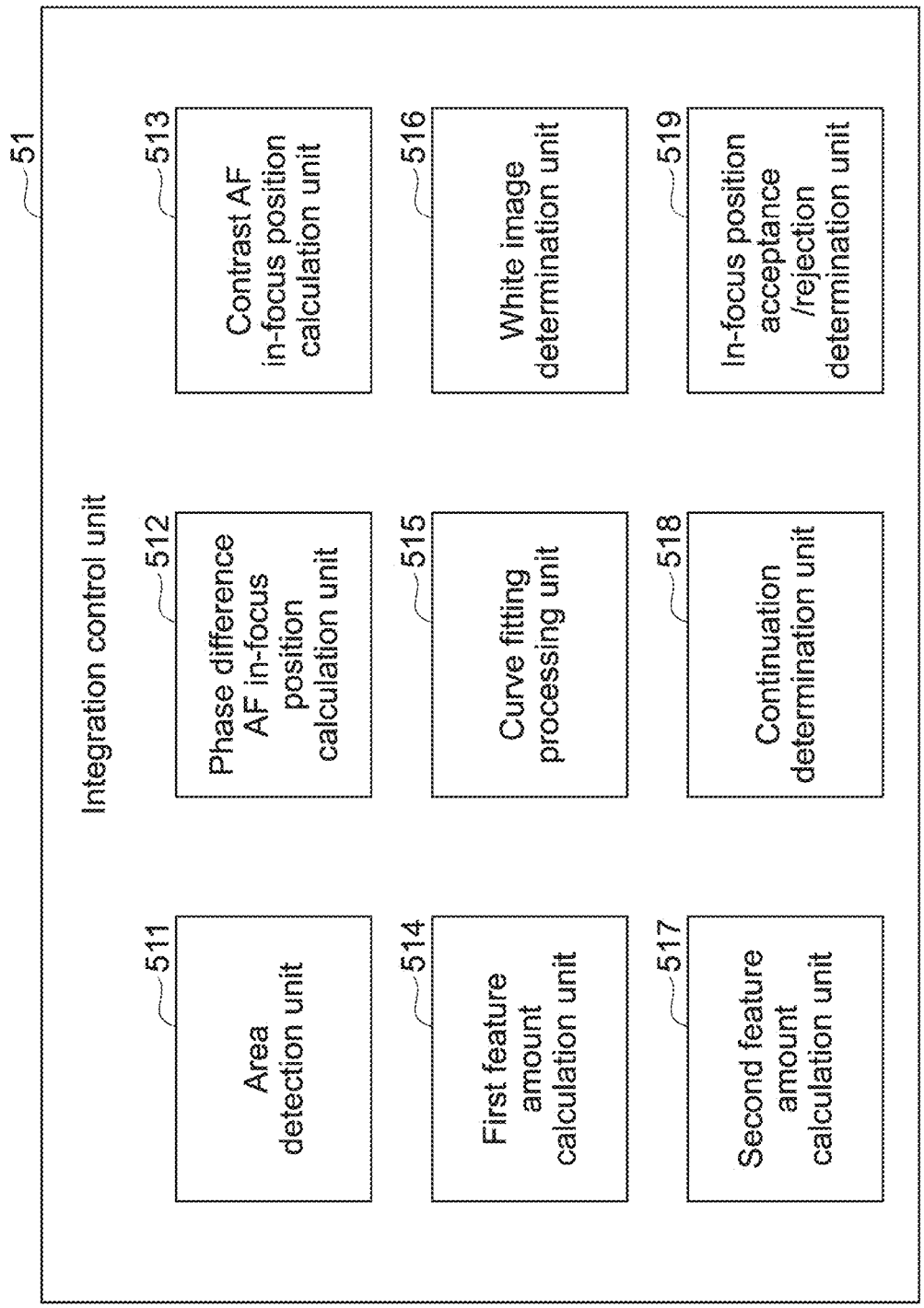
FIG. 2 is a functional block diagram showing functions for achieving control in an integration control unit 51.

Next, the integration control unit 51 described above will be described in detail. FIG. 2 is a functional block diagram showing a function for achieving control in the integration control unit 51.

In the digital microscope apparatus 100 of this embodiment, the integration control unit 51 performs control according to a program stored in a main memory in the integration control unit 51.

As shown in the figure, the integration control unit 51 includes an area detection unit 511, a phase difference AF in-focus position calculation unit (phase difference AF processing unit) 512, a contrast AF in-focus position calculation unit (search image acquisition unit, in-focus position determination unit) 513, a first feature amount calculation unit 514, a curve fitting processing unit (curve fitting unit) 515, a white image determination unit 516, a second feature amount calculation unit 517, a continuation determination unit 518, and an in-focus position acceptance/rejection determination unit (in-focus position determination unit) 519.

Those functional blocks are achieved when a program loaded in the main memory in the integration control unit 51 operates the integration control unit 51.

First, the area detection unit 511 partitions the overhead image, which is acquired by the overhead image capturing control unit 56 using the overhead image capturing unit 10, in a mesh in a size unit corresponding to the field of view of the enlarged image capturing unit 20. Each of the partitioned areas is the small area described above. Next, the area detection unit 511 determines whether an image of the sample SPL appears in each small area or not. The area detection unit 511 then extracts a small area, which is determined that the image of the sample SPL appears therein, and generates a photographing list and photographing sequence information. For the determination on whether the image of the sample SPL appears or not, for example, a small area in which the image of the sample SPL exists is determined in the overhead image based on a pixel distribution in which luminance values drastically change. To detect pixels whose luminance values drastically change, for example, a method of detecting a boundary of a sample by edge detection is used.

The phase difference AF in-focus position calculation unit 512 calculates the amount of defocus (in-focus position) and the orientation of defocus of the objective lens 23 of the enlarged image capturing unit 20 with respect to the sample SPL, based on a distance between the set of phase difference images acquired from the phase difference image capturing control unit 55. Further, the phase difference AF in-focus position calculation unit 512 divides the photographing data of the phase difference images formed by the two separator lenses 33 into, for example, 8×6 areas, and detects areas having features. The phase difference AF in-focus position calculation unit 512 then calculates in-focus positions for those areas having features and supplies location information and the in-focus positions of those areas having features to the integration control unit 51.

The contrast AF in-focus position calculation unit 513 instructs the enlarged image capturing control unit 57 to capture a plurality of enlarged images of the small areas as photographing targets, while instructing the stage control unit 53 to change a position of the sample SPL in the Z-axis direction. The contrast AF in-focus position calculation unit 513 also supplies the captured images of the small areas to the first feature amount calculation unit 514 to calculate a first feature amount for each of the images. The contrast AF in-focus position calculation unit 513 supplies the calculated first feature amounts to the curve fitting processing unit 515 and acquires an in-focus position in the contrast AF system.

The first feature amount calculation unit 514 calculates the first feature amount for the curve fitting processing unit 515 calculating an in-focus position in the contrast AF system by curve fitting to a quadratic function. The method of calculating the first feature amount will be described later.

The curve fitting processing unit 515 performs fitting onto a quadratic curve on three or more first feature amounts supplied from the integration control unit 51, and calculates an in-focus position in the contrast AF system from a vertex position of the quadratic curve.

The white image determination unit 516 determines whether the supplied enlarged image is an image in which the sample SPL does not appear at all (white image). For the determination, a second feature amount calculated by the second feature amount calculation unit 517 is used. The details will be described later.

The second feature amount calculation unit 517 calculates a second feature amount. The second feature amount is used as an index in a determination on a white image by the white image determination unit 516 and in a determination by the continuation determination unit 518 on whether there is an image of the sample SPL or not in a small area that is continuous (adjacent) to the small areas as photographing targets. The method of calculating the second feature amount will be described later.

As described above, the continuation determination unit 518 determines whether there is an image of the sample SPL or not in a small area that is continuous (adjacent) to the small areas that are current photographing targets for enlargement photographing. For the determination, a second feature amount calculated by the second feature amount calculation unit 517 is used. The details will be described later.

The in-focus position acceptance/rejection determination unit 519 determines whether the in-focus position by the phase difference AF system falls within a predetermined allowable range (acceptance) or not (rejection), the in-focus position being calculated by the phase difference AF in-focus position calculation unit 512. In the determination, the in-focus position acceptance/rejection determination unit 519 instructs the enlarged image capturing control unit 57 to capture a plurality of enlarged images of the small areas as photographing targets, while instructing the stage control unit 53 to change a position of the sample SPL in the Z-axis direction. The in-focus position acceptance/rejection determination unit 519 also supplies the captured images of the small areas to the first feature amount calculation unit 514 to calculate a first feature amount for each of the images. When a relationship between the values of the calculated first feature amounts satisfies a predetermined relational expression, the in-focus position acceptance/rejection determination unit 519 accepts the in-focus position by the phase difference AF system. The accepted in-focus position is used for actual photographing of the enlarged images.

[Regarding Overall Processing Flow]

Figure 3:
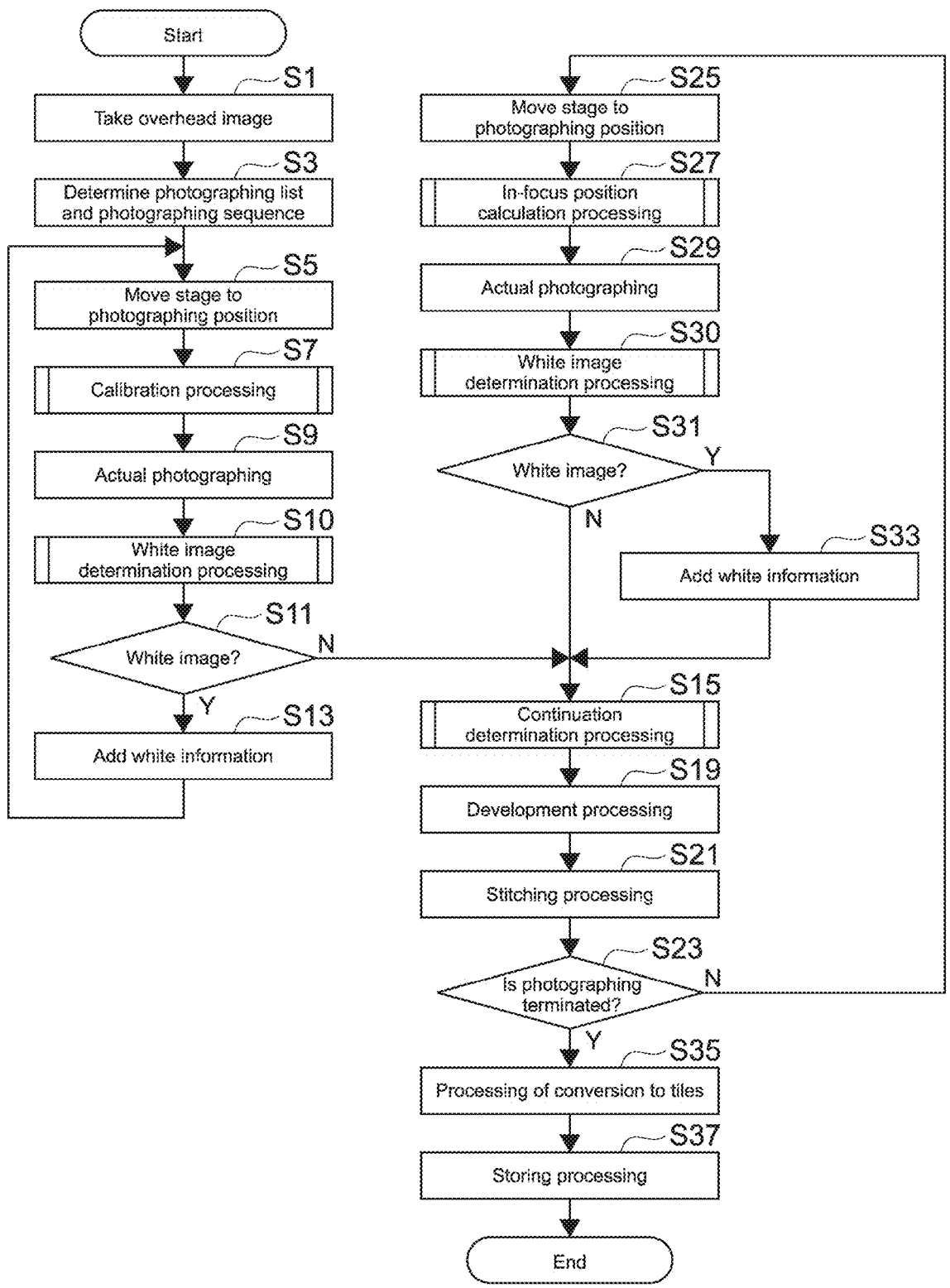
FIG. 3 is a flowchart for describing the entire processing flow in the digital microscope apparatus 100 of this embodiment.

Next, the overall processing flow in the digital microscope apparatus 100 of this embodiment will be described. FIG. 3 is a flowchart for describing the overall processing flow in the digital microscope apparatus 100 of this embodiment.

The difference between the present technology and a hybrid AF system in related art is as follows. In the hybrid AF system in related art, the in-focus positions are obtained by two systems of the phase difference AF system and the contrast AF system, and if the values of both the systems are close to each other, the reliability of the in-focus positions is considered to be high. Both of the AF systems are ranked equally.

In contrast to this, in the present technology, the features of the phase difference AF system and the contrast AF system are combined. In the phase difference AF system, a calculated in-focus position is inaccurate depending on the type of the sample SPL, but time spent to search for the in-focus position is definitely short. In the contrast AF system, time spent to search for the in-focus position is long, but the accuracy of a calculated in-focus position is high.

Namely, the present technology adopts a method of first obtaining a tentative in-focus position by the phase difference AF system and then confirming the validity of the tentative in-focus position by a simplified contrast AF system.

The simplified contrast AF system is as follows: since the phase difference AF can detect an area (having a feature), in which the sample SPL exists, on a taken image, the contrast AF of the present technology is performed on only such an area, to minimize the reduction in image acquiring speed by the contrast AF system.

As a first step, the integration control unit 51 instructs the overhead image capturing control unit 56 to take an overhead image of the preparation PRT (Step S1).

As the next step, the area detection unit 511 partitions the taken overhead image in a mesh in a size unit corresponding to the field of view of the enlarged image capturing unit 20. Each of the partitioned areas is the small area described above. Next, the area detection unit 511 determines whether an image of the sample SPL appears in each small area or not. The area detection unit 511 then extracts a small area, which is determined that the image of the sample SPL appears therein, and generates a photographing list and photographing sequence information (Step S3).

The area detection unit 511 performs the processing described above because of the following reasons.

Assuming that the digital microscope apparatus 100 uses the objective lens 23 of a 20-fold optical magnification, in the case where the imaging surface of the imaging device 24 of the enlarged image capturing unit 20 has a size of 37 mm×25 mm, the range of 1.87 mm×1.24 mm on the preparation PRT can be photographed at a time. The size of the photographing area on the preparation PRT, 60 mm×25 mm, is a larger than the above size. Therefore, the photographing area is partitioned into a plurality of small areas, the movement of the stage 40 and the photographing of the small areas are repeated a plurality of times to photograph the entire photographing area, and bonds the images of the small areas to be combined as one huge image, thus taking a huge image. In the bonding, at least approximately 5% to 20% of a margin is needed for combining the images to be bonded, and thus the small areas are photographed such that peripheral parts of the images of the adjacent small areas overlap.

In the case where the sample SPL has a small size (for example, 15 mm×15 mm), under such a circumstance, it is not known where in the photographing area on the preparation PRT the sample SPL exists. If the entire photographing area is intended to be covered, photographing of the small areas has to be performed by 828 (=36×23) times. However, if the position of the sample SPL is grasped and only that part can be photographed, photographing by 126 times (=9×14) is enough.

As described above, if a small area including an image of the sample SPL is detected using the overhead image, a photographing time can be significantly shortened.

As the following step, the integration control unit 51 instructs the stage control unit 53 to move the stage 40 such that the first small area of the photographing list comes immediately below the objective lens 23 (Step S5).

Namely, the integration control unit 51 imparts pieces of location information on individual small areas as photographing targets to the stage control unit 53. Consequently, based on the imparted pieces of location information of the areas as photographing targets, the stage control unit 53 drives the stage drive mechanism 41 to move the stage 40 such that the small area as a photographing target falls within the photographing range of the enlarged image capturing unit 20.

It should be noted that the position of the stage 40 in the Z direction is assumed to be a position that is the most closest to the objective lens 23. When the stage 40 is positioned at this Z position, the stage can be moved in a direction in which the stage 40 is kept away from the objective lens 23, in the search for the in-focus position by the contrast AF system. A distance between the stage 40 and the objective lens 23 has an interval of 50 μm or more in the shortest distance.

After the overhead image is taken, the preparation PRT transferred immediately below the objective lens 23 is irradiated with transmitted illumination from the light source 21. Transmitted light that has been transmitted through the sample SPL on the preparation PRT is input to the imaging device 24 of the enlarged image capturing unit 20 and the imaging device 34 of the defocus amount detection unit 30 via the objective lens (image-forming lens) 23 and the like.

As the next step, the integration control unit 51 performs calibration processing between the phase difference AF and the contrast AF (Step S7).

The calibration processing is indispensable processing in the digital microscope apparatus 100 of this embodiment, in which an in-focus position is calculated by the hybrid AF system using the phase difference AF system and the contrast AF system in combination. By this processing, an offset value for correcting a displacement between the in-focus position by the phase difference AF system and the in-focus position by the contrast AF system is obtained. The details of the calibration processing will be described later.

As the next step, the integration control unit 51 performs actual photographing of the small areas, using the in-focus position obtained by the calibration processing (Step S9).

The actual photographing is performed by the integration control unit 51 giving an instruction to the enlarged image capturing control unit 57.

As the next step, the integration control unit 51 instructs the white image determination unit 516 to perform white image determination processing (Step S10).

By this white image determination processing, it is determined whether an image obtained by performing actual photographing on the small area used in the calibration processing is an image in which the sample SPL does not appear (white image) or not.

As the next step, the integration control unit 51 determines whether an image obtained by performing actual photographing on the small area used in the calibration processing is a white image or not (Step S11).

In the case where the image is a white image (Y of Step S11), since the white image does not include the image of the sample SPL, the integration control unit 51 does not need to include the white image in images to be eventually stored, and as the next step, sets a white image flag such that the white image is not processed in the following processing (Step S13).

After setting the white image flag, the integration control unit 51 brings the processing back to Step S5 to move the stage 40 such that the next small area of the photographing list comes immediately below the objective lens 23.

In the case where the image is not a white image (N of Step S11), as the next step, the integration control unit 51 instructs the continuation determination unit 518 to perform continuation determination processing (Step S15).

The continuation determination processing verifies an image in a margin (to be described later) part of the image obtained by actual photographing, to thus verify the determination on whether the image of the sample SPL appears in each small area or not, the determination being performed by the area detection unit 511 in Step 3. This processing can reduce non-photographed images of the sample SPL.

In the method of determining in advance a small area to be photographed by using an overhead image, there are conceivable photographing by an imaging device having a low resolution that is different from the actual photographing using a CMOS imager as an imaging device, and photographing in a low magnification by switching the optical system while using the same imaging device as the actual photographing. In such cases, since the resolution of the overhead image is reduced, the overhead image is not photographed to detail. For example, since a part that is difficult to stain, such as fat cells, cannot be resolved in the overhead image, the part has a high possibility to be left non-photographed.

In this regard, in the present technology, for the part that cannot be photographed in the overhead image, such as fat cells, the margin part of the image acquired in the actual photographing is checked. Thus, small areas around the small area currently photographed, in which the image of the sample SPL cannot be detected in the processing of the overhead image, are also subjected to the detection.

As the next step, the integration control unit 51 instructs the development processing unit 59 to perform development processing of the image obtained by performing actual photographing (Step S19).

As the next step, the integration control unit 51 performs stitching processing of the images obtained by performing actual photographing (Step S21).

It should be noted that the development processing and stitching processing described above are performed in parallel with the in-focus position calculation processing and the actual photographing processing that are performed on a small area to be photographed next according to the photographing list.

As the next step, the integration control unit 51 determines whether the actual photographing and processing appertaining to the actual photographing are terminated or not for all the small areas in the photographing list (Step S23).

In the case where the actual photographing and processing appertaining to the actual photographing are not yet terminated for all the small areas in the photographing list (N of Step S23), the integration control unit 51 instructs the stage control unit 53 to move the stage 40 such that the next small area in the photographing list comes immediately below the objective lens 23 (Step S25).

As the next step, the integration control unit 51 performs the in-focus position calculation processing so as to calculate an in-focus position for performing actual photographing on a small area newly positioned immediately below the objective lens 23 (Step S27).

The in-focus point calculation processing is for calculating an in-focus position by the hybrid AF system combining the phase difference AF system and the contrast AF system. The details will be described later.

As the next step, the integration control unit 51 performs actual photographing on the small areas using the in-focus position obtained by the in-focus point calculation processing (Step S29).

The actual photographing can be performed by the integration control unit 51 giving an instruction to the enlarged image capturing control unit 57.

As the next step, the integration control unit 51 instructs the white image determination unit 516 to perform the white image determination processing (Step S30).

The white image determination processing performed here is different from the white image determination processing performed after the calibration processing, and does not have the meaning for determining the effectiveness of the calibration. The white image determination processing performed here is for simply setting a white image flag.

As the next step, the integration control unit 51 determines whether the image of the small area, which is obtained by actual photographing, is a white image or not (Step S31).

In the case where the image is a white image (Y of Step S31), as the next step, the integration control unit 51 sets a white image flag such that the white image is not included in the images to be eventually stored (Step S33).

In the case where the actual photographing and processing appertaining to the actual photographing are terminated for all the small areas in the photographing list (Y of Step S23), the integration control unit 51 instructs the image coding unit 602 to divide the huge image in units of tiles, the huge image being subjected to the stitching processing to be combined, and to code and compress the divided images (Step S35).

As the next step, the integration control unit 51 stores the compressed tile images in the storage unit 58 (Step S37).

The above description is the overall processing flow in the digital microscope apparatus 100 of this embodiment.

[Regarding Calibration Processing]

Figure 4:
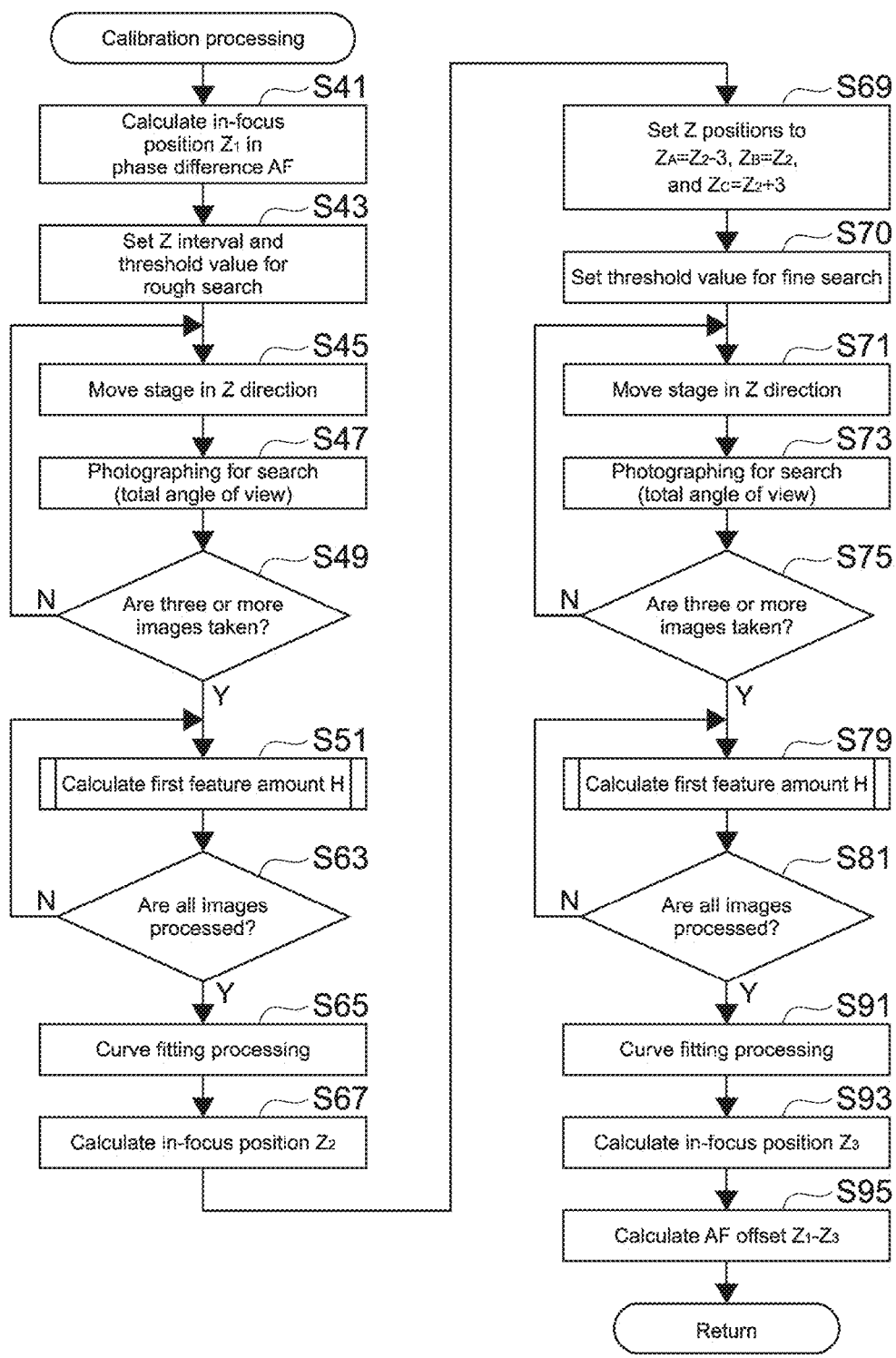
FIG. 4 is a flowchart for describing a flow of calibration processing.

Next, the flow of the calibration processing will be described. FIG. 4 is a flowchart for describing the flow of the calibration processing.

(Calculation in Phase Difference AF System)

As the first step, the phase difference AF in-focus position calculation unit 512 calculates an in-focus position Z1 in the phase difference AF system (Step S41).

(Rough Search in Contrast AF System)

As the next step, the contrast AF in-focus position calculation unit 513 sets positions in the Z-axis direction, ZA, ZB, and ZC (ZA>ZB>ZC), with the intervals for rough search in the Z-axis direction being set to be 25 μm, for example. Further, the contrast AF in-focus position calculation unit 513 sets a threshold value for rough search in the first feature amount calculation unit 514 (Step S43).

In the contrast AF, in order to search for a Z position that is roughly in focus, the rough search is first performed.

As the next step, the contrast AF in-focus position calculation unit 513 instructs the stage control unit 53 to move the stage 40 such that the position of the stage in the Z direction becomes the position set in Step S43 (Step S45).

In the rough search, the stage 40 is moved by 25 μm in a direction separated away from the objective lens 23 in the Z direction.

As the next step, the contrast AF in-focus position calculation unit 513 instructs the enlarged image capturing control unit 57 to take images of the small areas, as photographing for search (Step S47).

The enlarged image capturing control unit 57 reads pixel values of all the pixels (total angle of view) from the imaging device 24 of the enlarged image capturing unit 20. Image data is RAW data without change.

It should be noted that a total of three images corresponding to the respective three Z positions are taken.

As the next step, the contrast AF in-focus position calculation unit 513 determines whether search images are captured or not at all the set positions in the Z direction (Step S49).

In the case where all the necessary images are not captured (N of Step S49), the processing is returned back to Step S45 and repeated.

In the case where all the necessary images are captured (Y of Step S49), as the next step, the contrast AF in-focus position calculation unit 513 instructs the first feature amount calculation unit 514 to calculate a first feature amount H (Step S51).

One first feature amount H is calculated per image. Since the three images are obtained, the reciprocals of the first feature amounts H are obtained at three points on the graph, and thus curve fitting to a quadratic curve can be achieved. Since the quadratic curve has a vertex that is in focus at a position at which the first feature amount H becomes the largest (the reciprocal becomes the smallest), an in-focus position can be obtained. The method of calculating the first feature amount H will be described later.

As the next step, the contrast AF in-focus position calculation unit 513 determines whether the three images are processed or not (Step S63).

As the next step, the contrast AF in-focus position calculation unit 513 instructs the curve fitting processing unit 515 to perform curve fitting processing by using the calculated first feature amounts H (Step S65).

In the curve fitting processing, the reciprocals of the first feature amounts H are obtained to perform fitting on a quadratic curve with a convex facing down.

As the next step, the contrast AF in-focus position calculation unit 513 calculates an in-focus position Z2 from the vertex position of the quadratic curve by the curve fitting (Step S67).

The description above is on the flow of the rough search. The in-focus position Z2 acquired up to the above processing includes an error of approximately ±3 µm. In order to further increase the accuracy of the in-focus position, fine search processing in the contrast AF system is performed. Hereinafter, a procedure of fine search using the in-focus position Z2 by the contrast AF in-focus position calculation unit 513 will be described.

(Fine Search in Contrast AF System)

As the next step, the contrast AF in-focus position calculation unit 513 sets positions in the Z-axis direction ZA, ZB, and ZC (ZA>ZB>ZC), with the intervals for fine search in the Z-axis direction being set to be ±3 µm, for example, centering on the in-focus position Z2 (Step S69).

Further, the contrast AF in-focus position calculation unit 513 sets a threshold value for fine search in the first feature amount calculation unit 514 (Step S70).

As the next step, the contrast AF in-focus position calculation unit 513 instructs the stage control unit 53 to move the stage 40 such that the position of the stage in the Z direction becomes the position set in Step S69 (Step S71).

As the next step, the contrast AF in-focus position calculation unit 513 instructs the enlarged image capturing control unit 57 to take images of the small areas, as photographing for search (Step S73).

The enlarged image capturing control unit 57 reads pixel values of all the pixels (total angle of view) from the imaging device 24 of the enlarged image capturing unit 20. A total of three images corresponding to the respective three Z positions are taken.

As the next step, the contrast AF in-focus position calculation unit 513 determines whether search images are captured or not at all the set positions in the Z direction (Step S75).

In the case where all the necessary images are not captured (N of Step S75), the processing is returned back to Step S71 and repeated.

In the case where all the necessary images are captured (Y of Step S75), as the next step, the contrast AF in-focus position calculation unit 513 instructs the first feature amount calculation unit 514 to calculate first feature amounts H (Step S79).

As the next step, the contrast AF in-focus position calculation unit 513 determines whether the three images are processed or not (Step S81).

As the next step, the contrast AF in-focus position calculation unit 513 instructs the curve fitting processing unit 515 to perform curve fitting processing by using the calculated first feature amounts H (Step S91).

As the next step, the contrast AF in-focus position calculation unit 513 calculates an in-focus position Z3 from the vertex position of a quadratic curve by the curve fitting (Step S93).

As the last step, the integration control unit 51 calculates a difference between the in-focus positions Z1 and Z3 as an offset value due to the difference in the AF systems (Step S95).

The AF offset value calculated here is used for conversion in the in-focus position calculation processing when the in-focus position obtained in the phase difference AF system is used in the contrast AF system.

Heretofore, the flow of the calibration processing will be described.

[Regarding Processing to Calculate First Feature Amount H]

Figure 5:
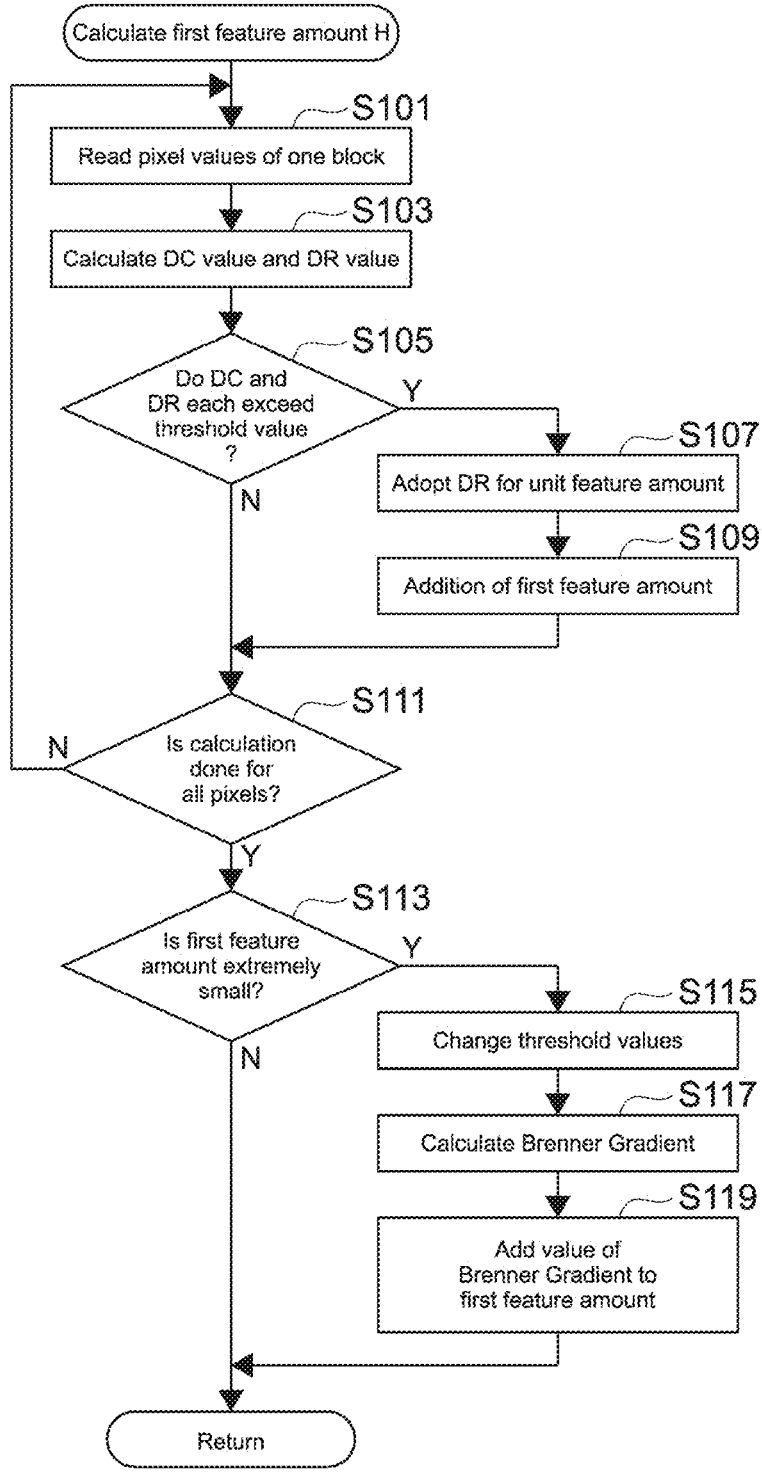
FIG. 5 is a flowchart for describing a flow of first feature amount H calculation processing.

Next, the flow of the first feature amount H calculation processing will be described. FIG. 5 is a flowchart for describing the flow of the first feature amount H calculation processing.

As the first step, the first feature amount calculation unit 514 reads pixel values of one block from the entire target RAW image or an partitioned area (Step S101).

Figure 6:
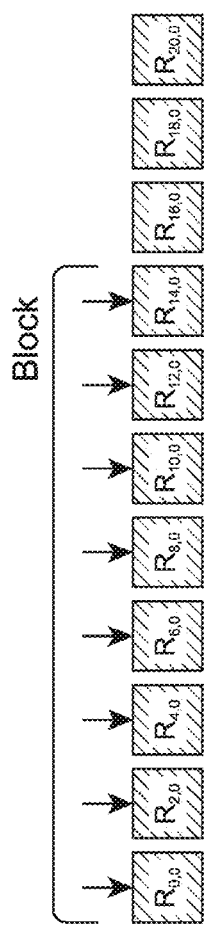
FIG. 6 is a diagram showing an example of one block.
Figure 7:
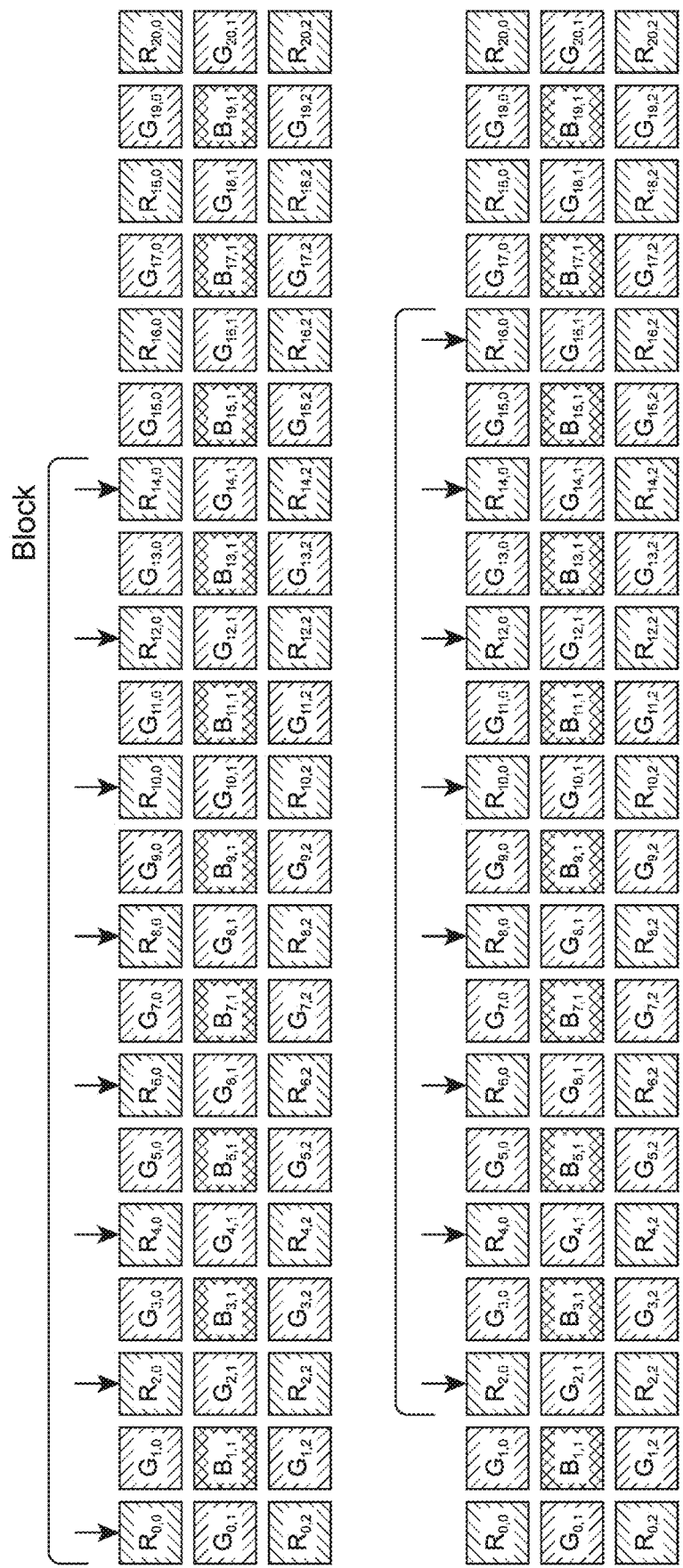
FIG. 7 is a diagram showing an example of one block.

One block is formed of i pixels vertically arranged by j pixels horizontally arranged (i and j are predetermined integers), in the arrangements of pixels having the same color. For example, as shown in FIG. 6 of a red plane and as shown in FIG. 7 of the Bayer array, an area including one vertically-arranged red pixel by eight horizontally-arranged red pixels can be set as one block.

Figure 8:
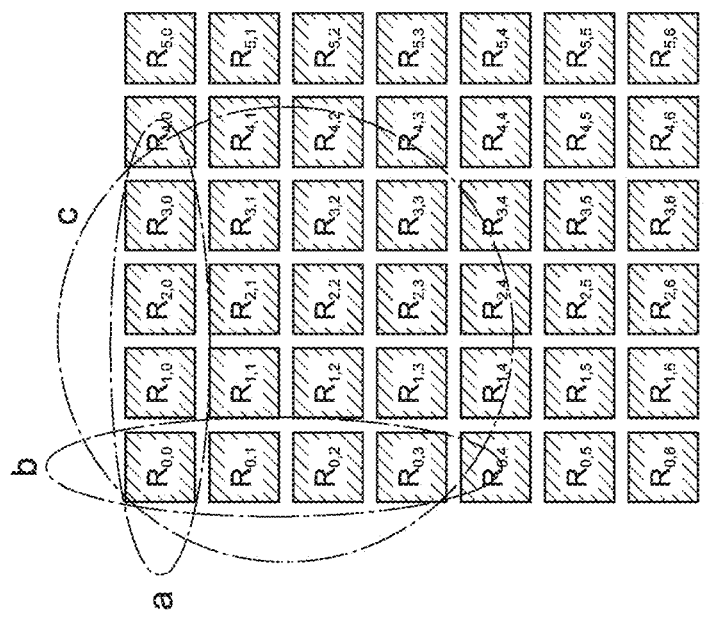
FIG. 8 is a diagram showing an example of pixels used when a feature amount is obtained in a red plane.
Figure 9:
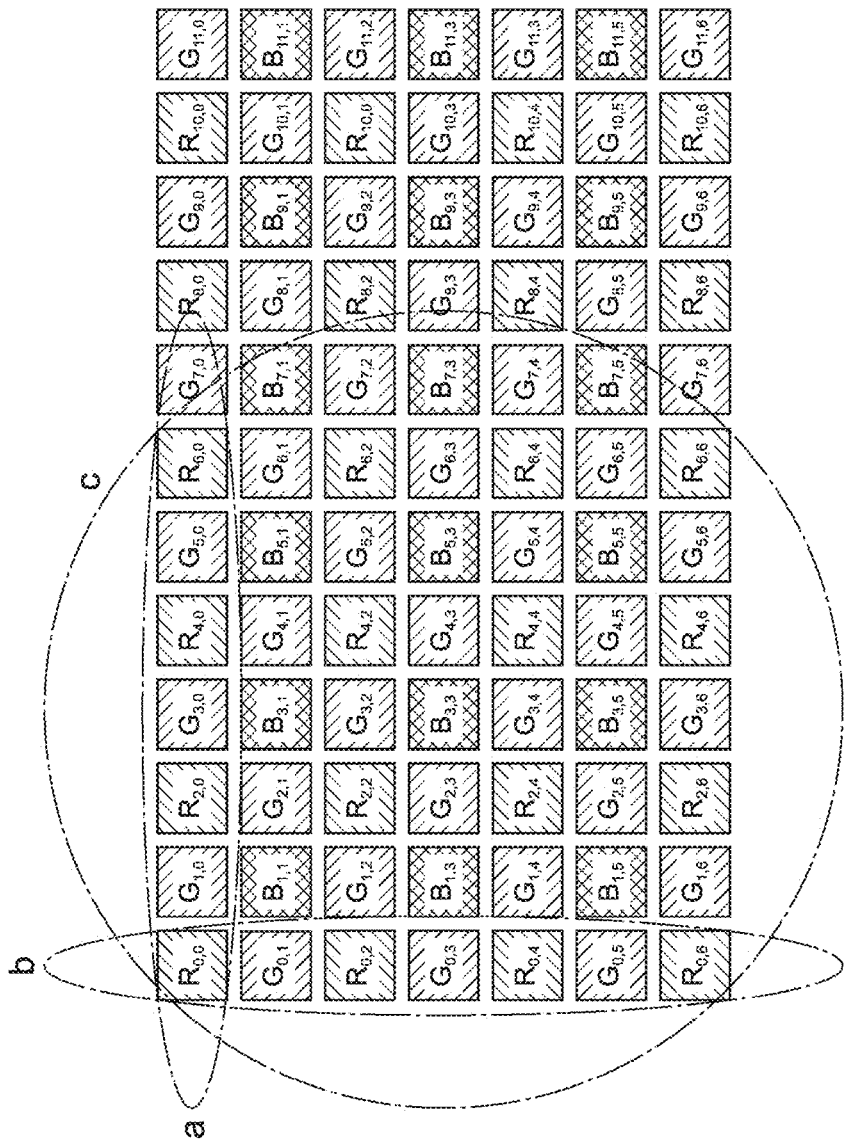
FIG. 9 is a diagram showing an example of pixels used when a red feature amount is obtained in the Bayer array.

It should be noted that FIG. 8 is an example of pixels used when a feature amount is obtained in a red plane. FIG. 9 is an example of pixels used when a red feature amount is obtained in the Bayer array.

As the next step, the first feature amount calculation unit 514 obtains the maximum value and the minimum value from pixel values of respective pixels in the read block. A direct current component value DC and a dynamic range DR of an alternating current component are obtained from the following expression (Step S103).

Direct Current Component DC=(Minimum Value)

Dynamic Range DR of Alternating Current Component= (Maximum Value)−(Minimum Value)

Figure 10:
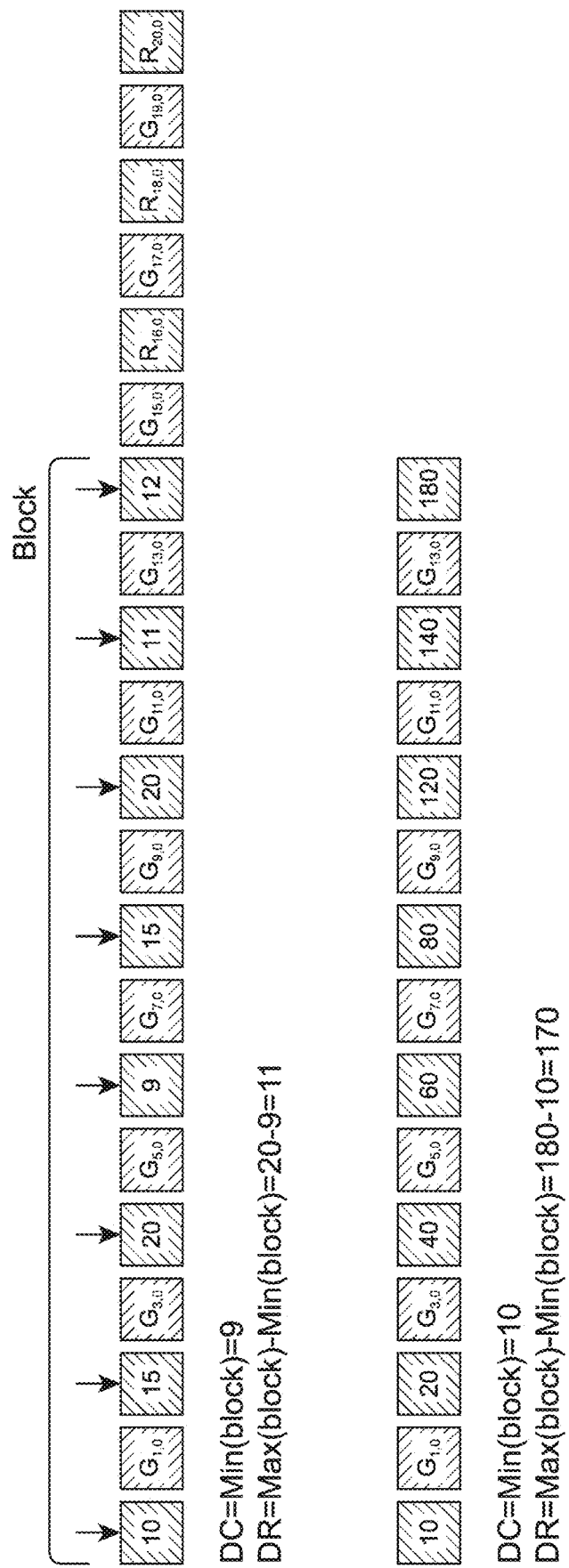
FIG. 10 is a diagram showing an example in which a direct current component DC and a dynamic range DR are obtained.

It should be noted that the minimum value is called here a direct current component. FIG. 10 is a diagram showing an example in which the direct current component DC and the dynamic range DR of an alternating current component are obtained.

As the next step, the first feature amount calculation unit 514 determines whether the obtained DC and DR each exceed a threshold value or not (whether the obtained DC and DR each satisfy a first condition and a second condition or not) (Step S105).

Threshold values DCt_min and DRt_min for determining whether the obtained DC and DR each exceed a threshold value or not are, in an imaging device having the output of 12 bits, for example, as follows: DCt_min=0 and DRt_min=128 in the case of the rough search; and DCt_min=0 and DRt_min=250 in the case of the fine search.

It should be noted that the upper limit values DCt_max and DRt_max that define the effective upper limits of the DC and DR are, for example, 4096 in both the values in the case of the rough search, and for example, DCt_min=0 and DRt_min=250 in the case of the fine search.

The reason why the DRt_min in the rough search is set to 128 is as follows: in the case of the rough search, an attenuation of the first feature amount is intended to be suppressed because the search is performed on a far distance, whereas noise included in a white part is intended to be cut at least. The imaging device involves shot noise. The shot noise appears by a square root thereof with respect to the intensity of a signal. The magnitude of the noise is obtained as 64 by the following expression, because the maximum value of the pixel values is 4096 in the case of the imaging device having the output of 12 bits.

Noise Intensity: sqr(4096)=64

The dynamic range DR is calculated from the difference between the maximum value and the minimum value of the pixel values. Thus, 64×2=128, which is obtained as the maximum value when the noise of the maximum value and that of the minimum value fluctuate upward and downward, is set as a threshold value.

It should be noted that the threshold value needs to be adjusted in accordance with the characteristics of the optical system or imaging device to be used.

In the case where the obtained DC and DR each exceed the threshold value (Y of Step S105), as the next step, the first feature amount calculation unit 514 adopts the dynamic range DR for a unit feature amount of the block (Step S107).

Using the dynamic range DR instead of a generally-used Brenner Gradient, the change of the first feature amount H is made gradual, to form a curve suited to the fitting.

As the next step, the first feature amount calculation unit 514 adds the unit feature amount, which is adopted in the previous step, to the first feature amount H (Step S109).

It should be noted that in this embodiment, the sum of the dynamic ranges DR is used as the first feature amount H, but in addition thereto, values shown in FIG. 11 can be each used as the first feature amount H.

As the next step, the first feature amount calculation unit 514 determines whether a feature amount is calculated for all the pixels or not (Step S111).

In the case where a feature amount is not yet calculated for all the pixels (N of Step S111), the processing returns back to Step S101 and continues for the next block. It should be noted that as a start point of the next block, a position of a pixel displaced from the previous start point by k pixels (k is a predetermined integer of 1 or more) is used. For example, in the case of a block including one vertically-arranged pixel by eight horizontally-arranged pixels, the start point may be displaced by one pixel or eight pixels.

If the start point of the block is displaced not by one pixel but by k pixels, the total number of arithmetic operations can be reduced, and the change in feature amount can be made gradual. As a result, a curve more suited to the fitting can be formed.

(Selection of Feature Amount Calculation Method)

As the next step, the first feature amount calculation unit 514 determines whether the value of the first feature amount H, which is obtained by adding all the unit feature amounts, is extremely small or not (Step S113).

In the case where the value of the first feature amount H is extremely small (Y of Step S113), the first feature amount calculation unit 514 changes the threshold values DCt and DRt to a direction in which a filter effect is reduced (Step S115).

As the next step, the first feature amount calculation unit 514 obtains a value of a Brenner Gradient for the entire target RAW image or an partitioned area (Step S117).

As the next step, the first feature amount calculation unit 514 adds the obtained value of the Brenner Gradient to the extremely small value of the first feature amount H (Step S119).

The feature amount using the dynamic range DR has property of being largely reduced when the focus is displaced. Further, because of being the sum of squares of differences of adjacent pixels, the Brenner Gradient also has a feature amount that sharply changes similarly to the dynamic range DR. Therefore, when both of them are simultaneously used, a feature of the sharp changes of the feature amounts outstands, and when both of them are used for the fitting, errors may increase. However, in the case where the first feature amount H is extremely small due to the reasons of a small sample SPL and the like and this value is intended to be increased even a little, the Brenner Gradient is also used in combination. As described above, by selecting a method of calculating a feature amount, which is suited to the state of the image for which the first feature amount H is obtained, the in-focus accuracy can be enhanced more.

Heretofore, the flow of the first feature amount H calculation processing has been described.

[Regarding In-Focus Position Calculation Processing]

Figure 12:
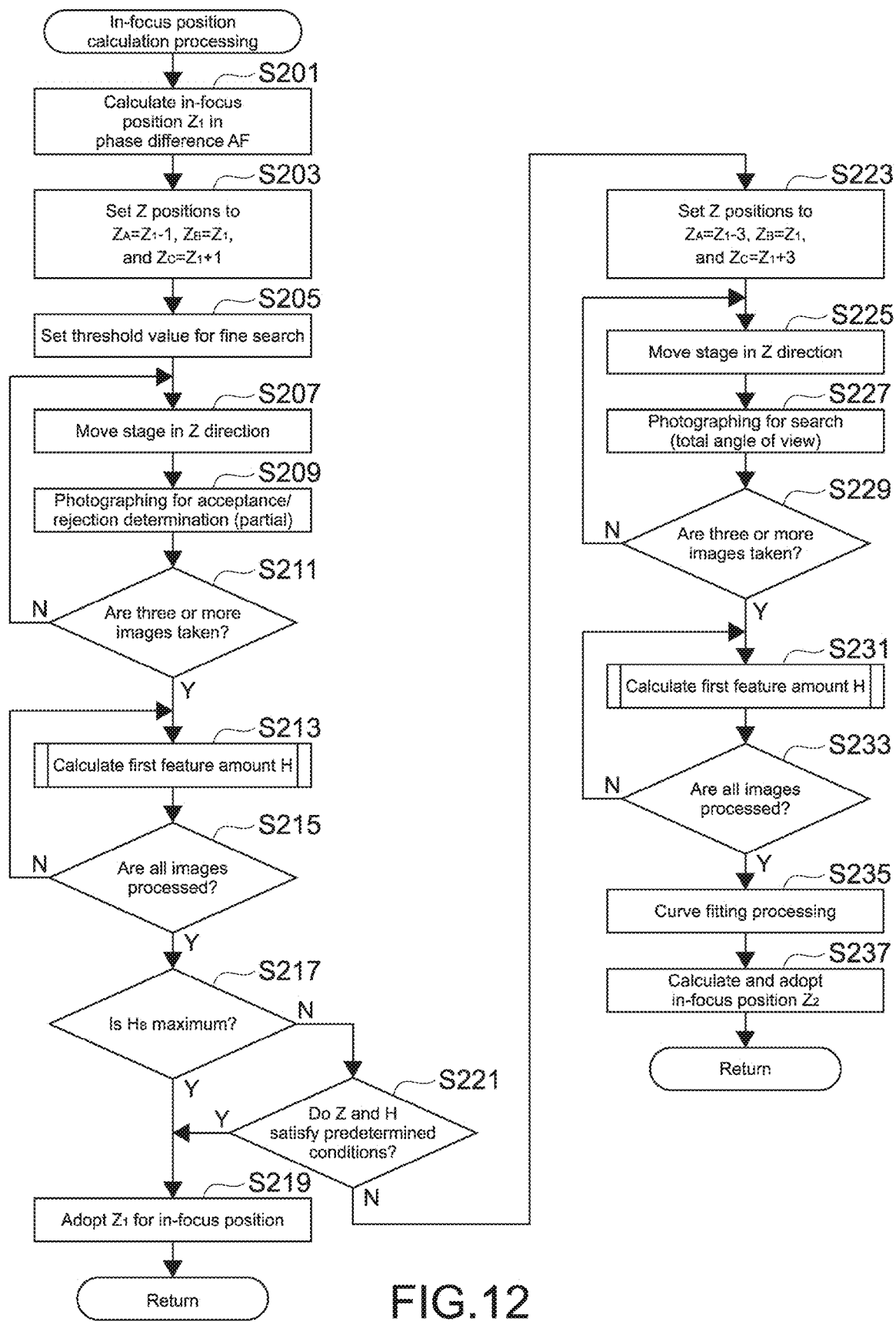
FIG. 12 is a flowchart for describing a flow of in-focus position calculation processing.

Next, the flow of the in-focus position calculation processing will be described. FIG. 12 is a flowchart for describing the flow of the in-focus position calculation processing.

In the basic flow, the in-focus position is quickly obtained by the phase difference AF system, and the validity of the position is verified by the contrast AF system. As a result of the verification, in the case where the in-focus position obtained by the phase difference AF system is valid, that position is adopted for actual photographing. In the case where the in-focus position obtained by the phase difference AF system is not valid, the in-focus position is obtained again by the contrast AF system.

(Calculation in Phase Difference AF System)

As the first step, the phase difference AF in-focus position calculation unit 512 calculates an in-focus position Z1 in the phase difference AF system (Step S201).

It should be noted that in this step a small area to be photographed is partitioned into m×n areas (m and n are predetermined integers of 1 or more), and the presence or absence of a feature is determined for each area, to obtain location information of each area having a feature. In a later step, the obtained location information is used when pixel values are read in the form of strips (read partially) from the imaging device 24 of the enlarged image capturing unit 20.

(Verification in Contrast AF System)

As the next step, the in-focus position acceptance/rejection determination unit 519 sets positions in the Z-axis direction, ZA, ZB, and ZC (ZA>ZB>ZC), with the intervals for verification in the Z-axis direction being set to be ±1 μm, for example, centering on the in-focus position Z1 (Step S203).

Further, the in-focus position acceptance/rejection determination unit 519 sets a threshold value for fine search in the first feature amount calculation unit 514 as a threshold value for verification (Step S205).

As the next step, the in-focus position acceptance/rejection determination unit 519 instructs the stage control unit 53 to move the stage 40 such that the position of the stage in the Z direction becomes the position set in Step S203 (Step S207).

As the next step, the in-focus position acceptance/rejection determination unit 519 instructs the enlarged image capturing control unit 57 to take an image of a small area as photographing for verification (Step S209).

The enlarged image capturing control unit 57 partitions the imaging surface of the imaging device 24 of the enlarged image capturing unit 20 into m×n areas as in Step S201, and reads only the pixel values of the areas having features partially (in the form of strips), based on the pieces of location information obtained in Step S201. Since the reading is partially performed, and the data amount to be processed in later processing is reduced, processing time required for the verification processing can be shortened.

It should be noted that a total of three images corresponding to the three Z positions are taken.

As the next step, the in-focus position acceptance/rejection determination unit 519 determines whether verification images are captured or not at all the set positions in the Z direction (Step S211).

In the case where all the necessary images are not captured (N of Step S211), the processing is returned back to Step S207 and repeated.

In the case where all the necessary images are captured (Y of Step S211), as the next step, the in-focus position acceptance/rejection determination unit 519 instructs the first feature amount calculation unit 514 to calculate a first feature amount H (Step S213).

It should be noted that in Step S213, a feature amount Gmn (area feature amount Gmn) for each area having a feature may also be obtained in addition to the first feature amount H.

As the next step, the in-focus position acceptance/rejection determination unit 519 determines whether the three images are taken or not (Step S215).

Figure 13:
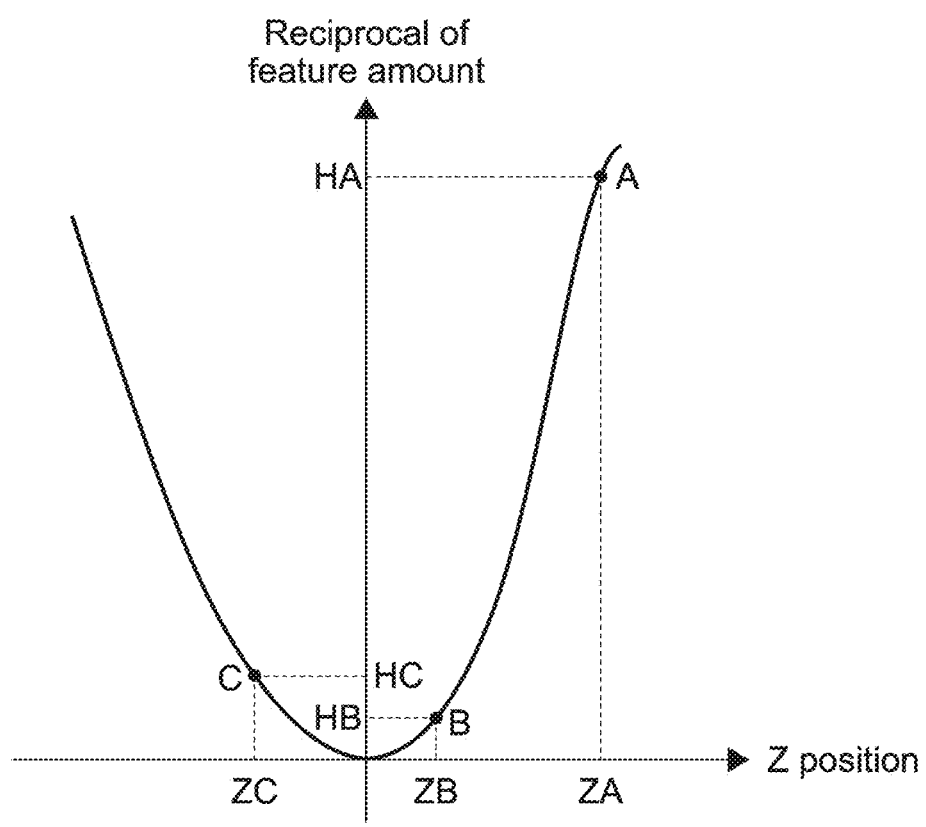
FIG. 13 is a diagram showing a state where three points, a point A (ZA, HA), a point B (ZB, HB), and a point C (ZC, HC) are plotted on a two-dimensional plane, with a Z position being set as a horizontal axis and a reciprocal of the first feature amount H being set as a vertical axis.

One first feature amount H is calculated per image. Three first feature amounts H of HA, HB, and HC are obtained to correspond to the three Z positions ZA, ZB, and ZC, respectively. FIG. 13 shows a state where three points, a point A (ZA, HA), a point B (ZB, HB), and a point C (ZC, HC) are plotted on a two-dimensional plane, with the Z position being set as the horizontal axis and a reciprocal of the first feature amount H being set as the vertical axis.

As the next step, the in-focus position acceptance/rejection determination unit 519 determines whether the HB is the maximum or not in the three first feature amounts H (Step S217).

In the case where the HB is the maximum (Y of Step S217), the in-focus position acceptance/rejection determination unit 519 adopts the in-focus position Z1, which is obtained in the phase difference AF system, for an in-focus position for actual photographing (Step S219).

In the case where the HB is not the maximum (N of Step S217), as the next step, the in-focus position acceptance/ rejection determination unit 519 determines whether tilts among the three points described above (points A, B, and C) satisfy the following conditional expressions or not (Step S221).

Assuming that a tilt between the point A and the point B is represented as a tilt AB and L is a predetermined value, the conditional expressions are as follows:

when tilt AB>tilt BC, $L > |\text{tilt } BC|/|\text{tilt } AB|$; and when tilt AB<tilt BC, $L > |\text{tilt } AB|/|\text{tilt } BC|$.

In the case where the tilts among the three points satisfy the conditional expressions (Y of Step S221), the in-focus position acceptance/rejection determination unit 519 adopts the in-focus position Z1, which is obtained in the phase difference AF system, for an in-focus position for actual photographing (Step S219).

It should be noted that in the above processing, the curve fitting is not performed and the validity of the in-focus position Z1 is verified by the conditional expressions for tilts. However, when the curve fitting is performed here to obtain an in-focus position again, a more accurate in-focus position can be obtained. If the in-focus position is obtained again, the stage 40 is required to be moved to that position again, and it takes more time accordingly. Therefore, any of the systems may be selected depending on which of the image quality and the processing time is prioritized.

In the case where the curve fitting is performed in Step S219, the curve fitting is performed using the first feature amount H and the plurality of area feature amounts Gmn, to obtain an in-focus position ZH and an in-focus position ZGmn.

Since the tilt of the sample SPL in a small area is known from the in-focus position ZGmn, in order to obscure seams at boundaries when the images are bonded, one of the plurality of in-focus positions ZGmn is selected such that a displacement of the in-focus positions at the boundaries becomes minimum. In the selection, the ZGmn having a value that is extremely different from the in-focus position ZH is excluded from candidates for the selection.

Specifically, in the case where the in-focus position ZGmn of an area near the center of the small area is different from the in-focus position ZGmn of a surrounding area, the in-focus position ZGmn of the surrounding area is adopted as an in-focus position of actual photographing. In the case where the sample SPL is oblique as a whole, the in-focus position ZGmn of the area near the center is adopted as an in-focus position of actual photographing. In the case where the sample SPL is uniform as a whole without a tilt, the in-focus position ZH is adopted as an in-focus position of actual photographing.

The area feature amount Gmn is obtained for each area, and depending on a situation of the value thereof, the in-focus position is finely adjusted. Thus, the seams at the boundaries when the images are bonded can be obscured as compared to the case where only one feature amount is obtained from the image of one small area.

By this method, it is possible to obtain an in-focus position at which a focus error is suppressed up to 0.8 μm.

In the case where the tilts among the three points do not satisfy the conditional expressions (N of Step S221), the in-focus position Z1 obtained in the phase difference AF system cannot be adopted for the in-focus position for actual photographing. The in-focus position acceptance/rejection determination unit 519 then controls the contrast AF in-focus position calculation unit 513 to calculate an in-focus position by the contrast AF system. It should be noted that the in-focus position is not largely displaced from the in-focus position of an adjacent small area, which is already obtained. Therefore, the rough search is not basically performed and the search is started from the fine search.

(Fine Search in Contrast AF System)

As the next step, the contrast AF in-focus position calculation unit 513 sets positions in the Z-axis direction ZA, ZB, and ZC (ZA>ZB>ZC), with the intervals for fine search in the Z-axis direction being set to be ±3 μm, for example, centering on the in-focus position Z1 (Step S223).

It should be noted that the threshold value for fine search is set in Step S203, and thus not set again.

As the next step, the contrast AF in-focus position calculation unit 513 instructs the stage control unit 53 to move the stage 40 such that the position of the stage in the Z direction becomes the position set in Step S223 (Step S225).

As the next step, the contrast AF in-focus position calculation unit 513 instructs the enlarged image capturing control unit 57 to take images of the small areas, as photographing for search (Step S227).

The enlarged image capturing control unit 57 reads pixel values of all the pixels (total angle of view) from the imaging device 24 of the enlarged image capturing unit 20. When the in-focus position in the phase difference AF system is verified, the pixel values are read for minimum areas based on the location information obtained by the phase difference AF system. However, in the case where the in-focus position by the phase difference AF system cannot be adopted, the location information obtained by the phase difference AF system is determined to be unreliable, and the pixel values are read for all areas (total angle of view), not by partial reading based on the location information.

It should be noted that a total of three images corresponding to the three Z positions are taken.

As the next step, the contrast AF in-focus position calculation unit 513 determines whether search images are captured or not at all the set positions in the Z direction (Step S229).

In the case where all the necessary images are not captured (N of Step S229), the processing is returned back to Step S225 and repeated.

In the case where all the necessary images are captured (Y of Step S229), as the next step, the contrast AF in-focus position calculation unit 513 instructs the first feature amount calculation unit 514 to calculate first feature amounts H (Step S231).

As the next step, the contrast AF in-focus position calculation unit 513 determines whether the three images are processed or not (Step S233).

As the next step, the contrast AF in-focus position calculation unit 513 instructs the curve fitting processing unit 515 to perform curve fitting processing by using the calculated first feature amounts H (Step S235).

As the next step, the contrast AF in-focus position calculation unit 513 calculates an in-focus position Z2 from the vertex position of a quadratic curve by the curve fitting, and adopts the calculated in-focus position Z2 as an in-focus position for actual photographing (Step S237).

In the case where the calculated in-focus position Z2 is inappropriate to be adopted, the contrast AF in-focus position calculation unit 513 may perform processing from the rough search again, or if there is information on an in-focus position when an adjacent small area is actually photographed, that information may be interpolated for use.

By the processing described above, it is possible to achieve a hybrid AF system in which images are acquired at high speed and in-focus accuracy is high.

For example, in the case where 1000 small areas are photographed, it is assumed that processing time in the phase difference AF is 20 msec, processing time in photographing for determining acceptance or rejection (partial reading, 10% of areas having features with respect to the total angle of view, three images) is 51 msec, and processing time in photographing for fine search (reading at the total angle of view, three images) is 510 msec. Assuming that a possibility (failure rate) of being rejection in the acceptance/rejection determination and performing photographing for fine search is X, and processing time in the hybrid AF system and processing time in the contrast AF are equal to each other, the following expression is established.

(20 msec+51 msec+510 msec×$X$)×1000=510 msec× 1000

If this expression is solved, X=0.86. Namely, in the case where the areas having features occupy 10% of the total area, the hybrid AF system can achieve photographing at higher speed as long as the failure rate does not exceed 86%.

Heretofore, the flow of the in-focus position calculation processing has been described.

[Regarding White Image Determination Processing]

Figure 14:
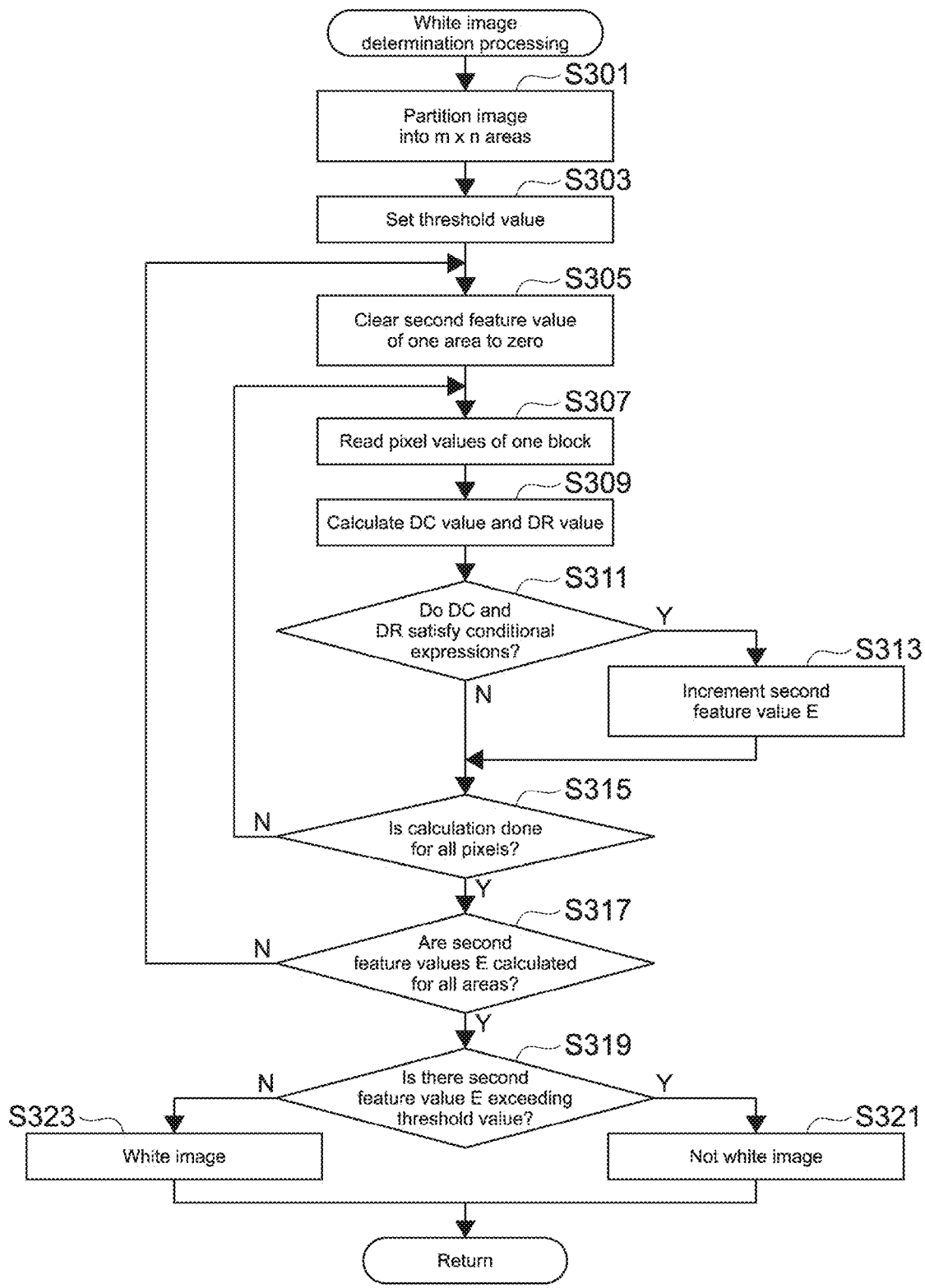
FIG. 14 is a flowchart for describing a flow of white image determination processing.

Next, the flow of the white image determination processing will be described. FIG. 14 is a flowchart for describing the flow of the white image determination processing.

As the first step, the white image determination unit 516 partitions the entire image of the small area obtained by photographing into p×q (p and q are predetermined positive integers) areas (Step S301).

As the next step, the white image determination unit 516 sets a threshold value used by the second feature amount calculation unit 517 (Step S303).

As the next step, the second feature amount calculation unit 517 clears a second feature amount E of an area to be processed, to zero (Step S305).

As the next step, the second feature amount calculation unit 517 reads pixel values of one block (Step S307).

The definition of a block is the same as the definition when the first feature amount is calculated, and thus description thereof will be omitted here.

As the next step, the second feature amount calculation unit 517 calculates a direct current component DC and a dynamic range DR (Step S309).

The method of calculating the direct current component DC and the dynamic range DR is the same as the method when the first feature amount is calculated, and thus description thereof will be omitted.

As the next step, the second feature amount calculation unit 517 determines whether the calculated direct current component DC and dynamic range DR satisfy the following conditional expressions or not (Step S311).

Assuming that the minimum threshold value of the direct current component DC is DCt_min, the maximum threshold value thereof is DCt_max, the minimum threshold value of the dynamic range DR is DRt_min, and the maximum threshold value thereof is DRt_max, the conditional expressions are as follows:

$DCt\_min < DC < DCt\_max$; and $DRt\_min < DR < DRt\_max$.

The values of the threshold values are, for example, DCt_min=1800, and DRt_min=200.

In the case where the direct current component DC and the dynamic range DR satisfy the conditional expressions described above (Y of Step S311), the second feature amount calculation unit 517 increments the second feature amount E (Step S313).

As the next step, the second feature amount calculation unit 517 determines whether the processing is performed on all the pixels or not (Step S315).

In the case where the processing is not yet performed for all the pixels (N of Step S315), the processing is returned back to Step S307 and continued for the following block.

In the case where the processing is performed for all the pixels (Y of Step S315), as the next step, the white image determination unit 516 determines whether the second feature amounts E are calculated for all the areas or not (Step S317).

In the case where the second feature amounts E are not yet calculated for all the areas (N of Step S317), the processing is returned back to Step S305 and continued for the following area.

In the case where the second feature amounts E are calculated for all the areas (Y of Step S317), as the next step, the white image determination unit 516 determines whether there is a second feature amount E exceeding a sample presence confirming threshold value Et or not (Step S319).

The value of the sample presence confirming threshold value Et is, for example, 2500.

When the second feature amounts E are calculated for all the areas, a total of p×q second feature amounts E are calculated.

Figure 15:
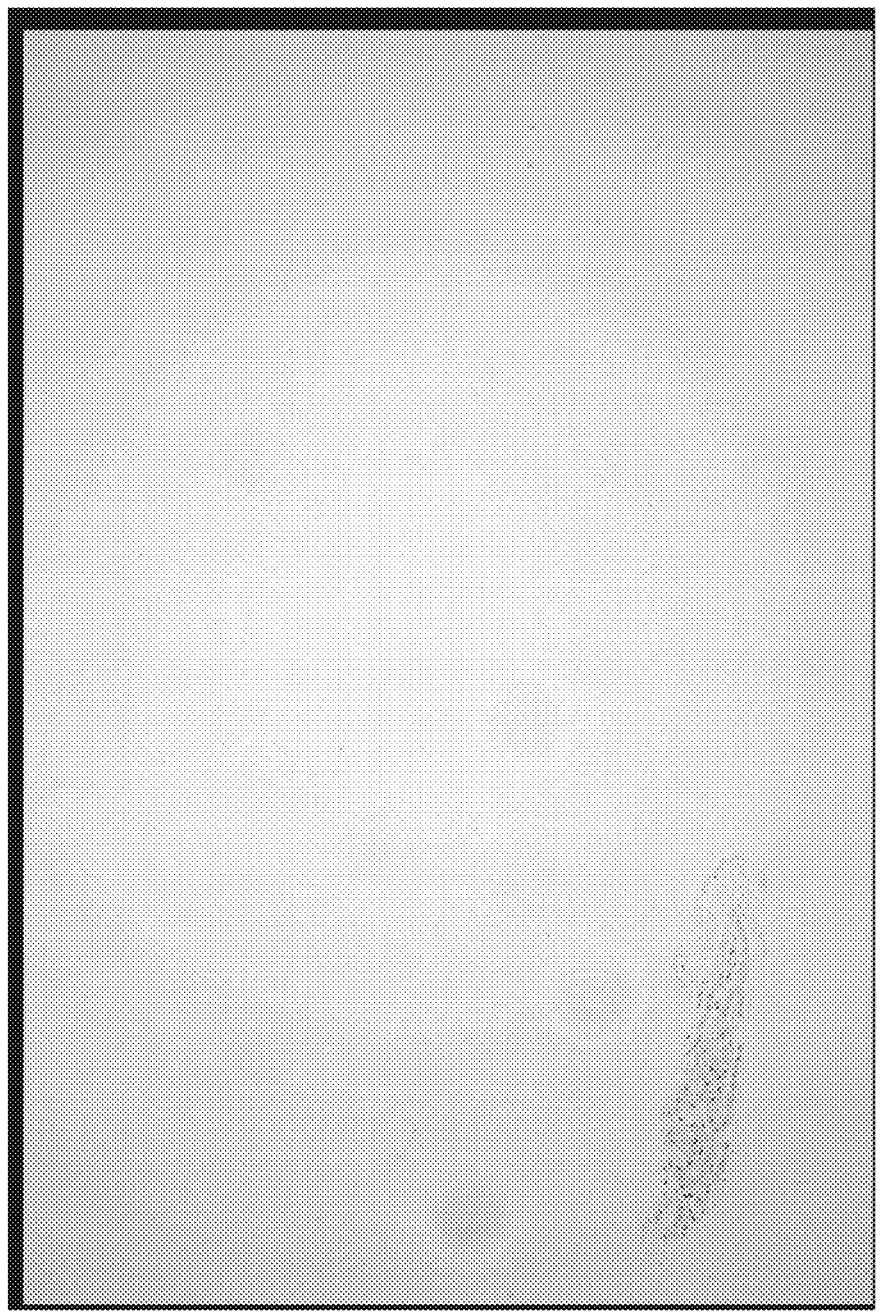
FIG. 15 is an image of a sample SPL subjected to HE staining (hematoxylin-eosin staining).

FIG. 16 shows a state where the second feature amounts E for respective areas are calculated by the white determination processing in an image of a sample SPL subjected to HE staining (hematoxylin-eosin staining) shown in FIG. 15.

Figure 17:
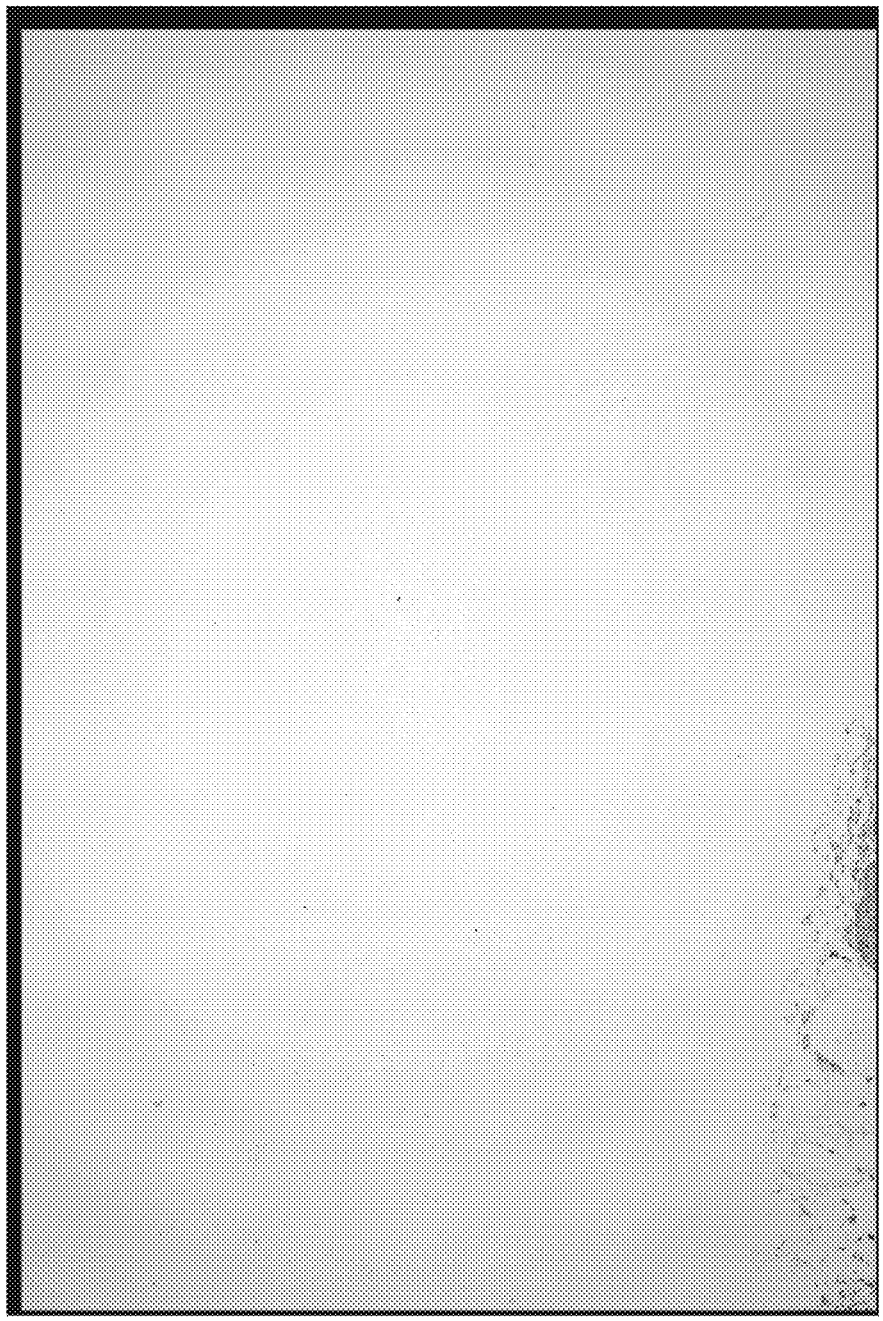
FIG. 17 is an image of a different sample SPL subjected to HE staining.

Further, FIG. 18 shows a state where the second feature amounts E for respective areas are calculated by the white determination processing in an image of a sample SPL subjected to different HE staining shown in FIG. 17.

In the case where there is even one second feature amount E exceeding the sample presence confirming threshold value Et (Y of Step S319), the white image determination unit 516 determines that the taken image is not a white image because the sample SPL appears in the photographed image (Step S321).

In the case where there is no even one second feature amount E exceeding the sample presence confirming threshold value Et (N of Step S319), the white image determination unit 516 determines that the taken image is a white image in which the sample SPL does not appear (Step S323).

In the image of the small area that is determined to be the white image, a white image flag is set therefor, and the image is not processed in the development processing and subsequent processing. Thus, shortening processing time and reducing the capacity for storing images can be achieved.

Heretofore, the flow of the white image determination processing has been described.

[Regarding Continuation Determination Processing]

Figure 19:
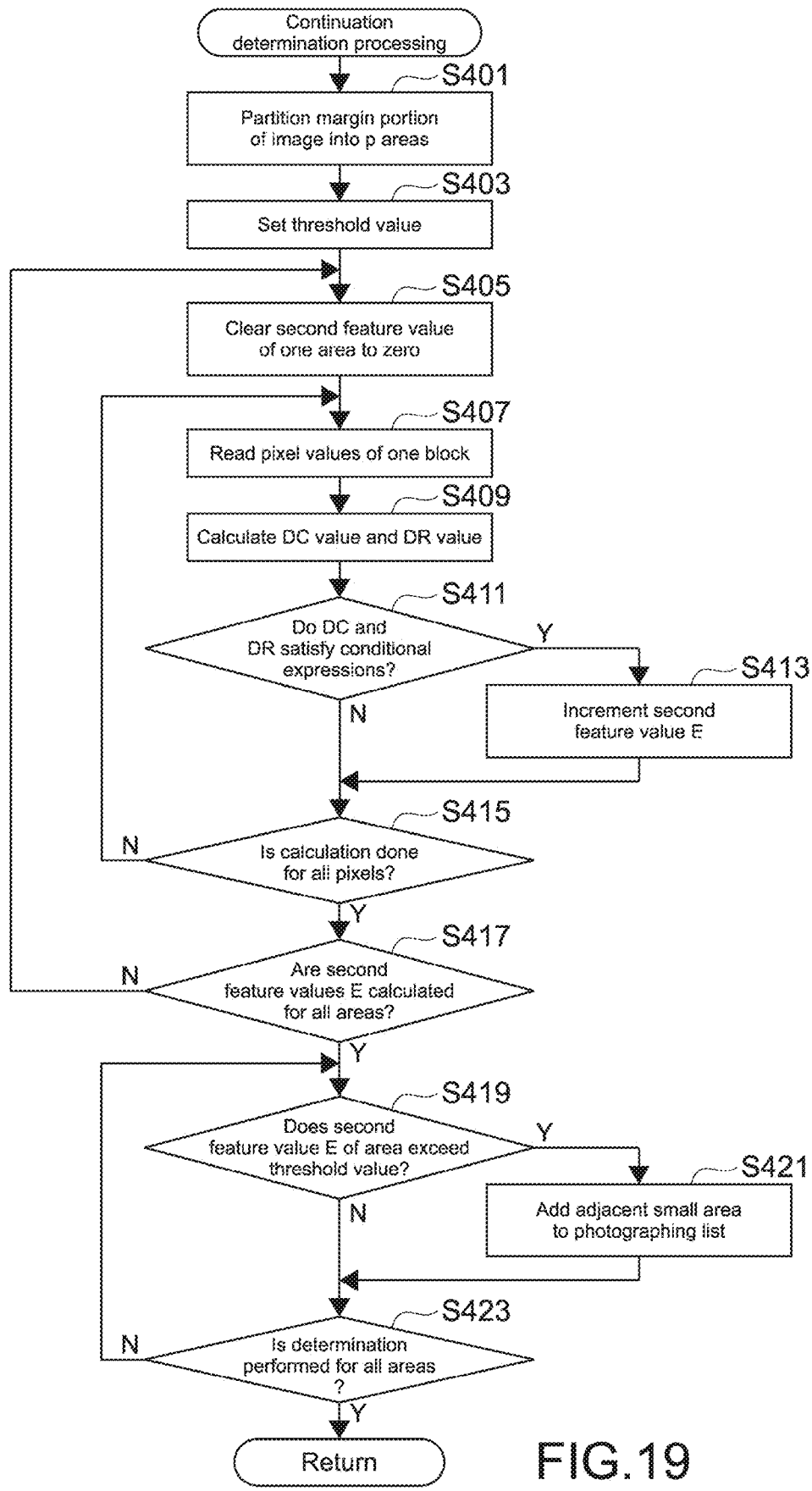
FIG. 19 is a flowchart for describing a flow of continuation determination processing.

Next, the flow of the continuation determination processing will be described. FIG. 19 is a flowchart for describing the flow of the continuation determination processing.

As the first step, the continuation determination unit 518 partitions a peripheral part (margin part) of the image of the small area obtained by photographing into p areas (p is a predetermined integer of 2 or more) (Step S401).

As the next step, the continuation determination unit 518 sets a threshold value used by the second feature amount calculation unit 517 (Step S403).

As the next step, the second feature amount calculation unit 517 clears a second feature amount E of an area to be processed, to zero (Step S405).

As the next step, the second feature amount calculation unit 517 reads pixel values of one block (Step S407).

The definition of a block is the same as the definition when the first feature amount is calculated, and thus description thereof will be omitted here.

As the next step, the second feature amount calculation unit 517 calculates a direct current component DC and a dynamic range DR (Step S409).

The method of calculating the direct current component DC and the dynamic range DR is the same as the method when the first feature amount is calculated, and thus description thereof will be omitted.

As the next step, the second feature amount calculation unit 517 determines whether the calculated direct current component DC and dynamic range DR satisfy the following conditional expressions or not (Step S411).

Assuming that the minimum threshold value of the direct current component DC is DCt_min, the maximum threshold value thereof is DCt_max, the minimum threshold value of the dynamic range DR is DRt_min, and the maximum threshold value thereof is DRt_max, the conditional expressions are as follows:

$$DCt\_min < DC < DCt\_max;\text{ and}$$

$$DRt\_min < DR < DRt\_max.$$

The values of the threshold values are, for example, DCt_min=1800, and DRt_min=200.

In the case where the direct current component DC and the dynamic range DR satisfy the conditional expressions described above (Y of Step S411), the second feature amount calculation unit 517 increments the second feature amount E (Step S413).

As the next step, the second feature amount calculation unit 517 determines whether the processing is performed on all the pixels or not (Step S415).

In the case where the processing is not yet performed for all the pixels (N of Step S415), the processing is returned back to Step S407 and continued for the following block.

In the case where the processing is performed for all the pixels (Y of Step S415), as the next step, the continuation determination unit 518 determines whether the second feature amounts E are calculated for all the areas or not (Step S417).

In the case where the second feature amounts E are not yet calculated for all the areas (N of Step S417), the processing is returned back to Step S405 and continued for the following area.

When the second feature amounts E are calculated for all the areas, a total of p second feature amounts E are calculated.

FIG. 20 shows a state where the second feature amounts E for respective areas are calculated by the continuation determination processing in the image of the sample SPL shown in FIG. 15.

Further, FIG. 21 shows a state where the second feature amounts E for respective areas are calculated by the continuation determination processing in an image of a different sample SPL shown in FIG. 17.

In the case where the second feature amounts E are calculated for all the areas (Y of Step S417), as the next step, the continuation determination unit 518 determines whether the second feature amount E of each area exceeds the sample presence confirming threshold value Et or not (Step S419).

The value of the sample presence confirming threshold value Et is, for example, 2500.

In the case where the second feature amount E exceeds the sample presence confirming threshold value Et (Y of Step S419), the continuation determination unit 518 adds a small area adjacent to that area to the photographing list (Step S421).

In the case where the adjacent small area is already in the photographing list, addition processing is not performed.

As the next step, the continuation determination unit 518 determines whether the determination of Step S417 is performed for all the areas or not (Step S423).

In the case where the determination of Step S417 is not yet performed for all the areas (N of Step S423), the processing is returned back to Step S417 and continued for the remaining areas.

By the continuation determination processing, it is possible to prevent the sample SPL from being partially left non-photographed.

Heretofore, the flow of the continuation determination processing has been described.

[Specific Examples of Curve Fitting]

Next, specific examples of the curve fitting performed by the curve fitting processing unit will be described, comparing the case of calculating the first feature amount H by a Brenner Gradient system in related art (hereinafter, called the system in related art) with the case of calculating the first feature amount H by a dynamic range DR system (hereinafter, called the present system).

Figure 22:
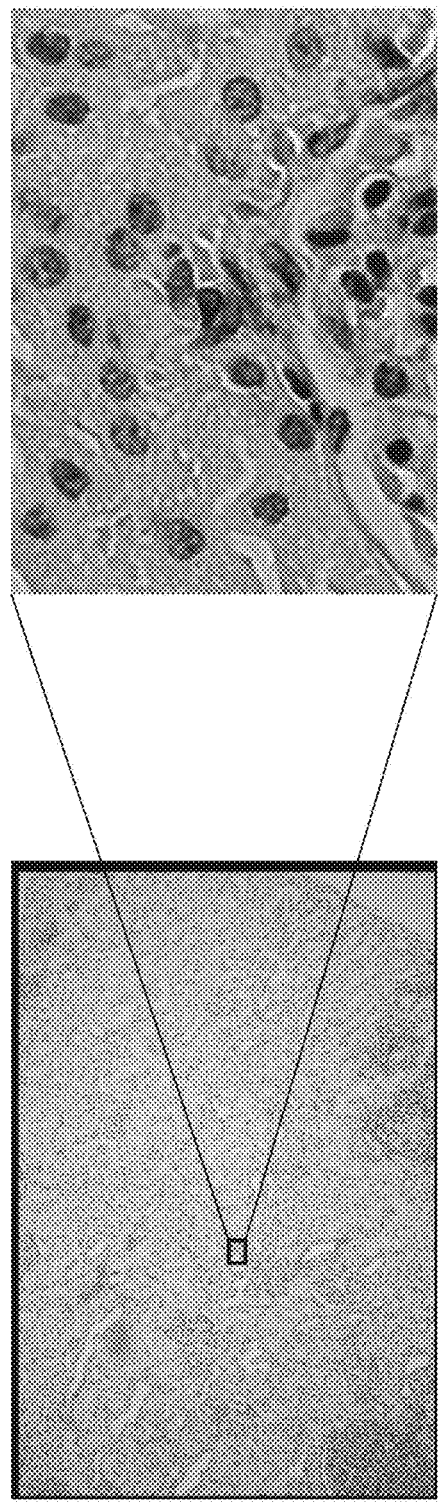
FIG. 22 is a diagram showing an image used in specific examples of curve fitting and a partially-enlarged small area of the image.

FIG. 22 is a diagram showing an image used in the following specific examples and a partially-enlarged small area of the image.

Figure 23:
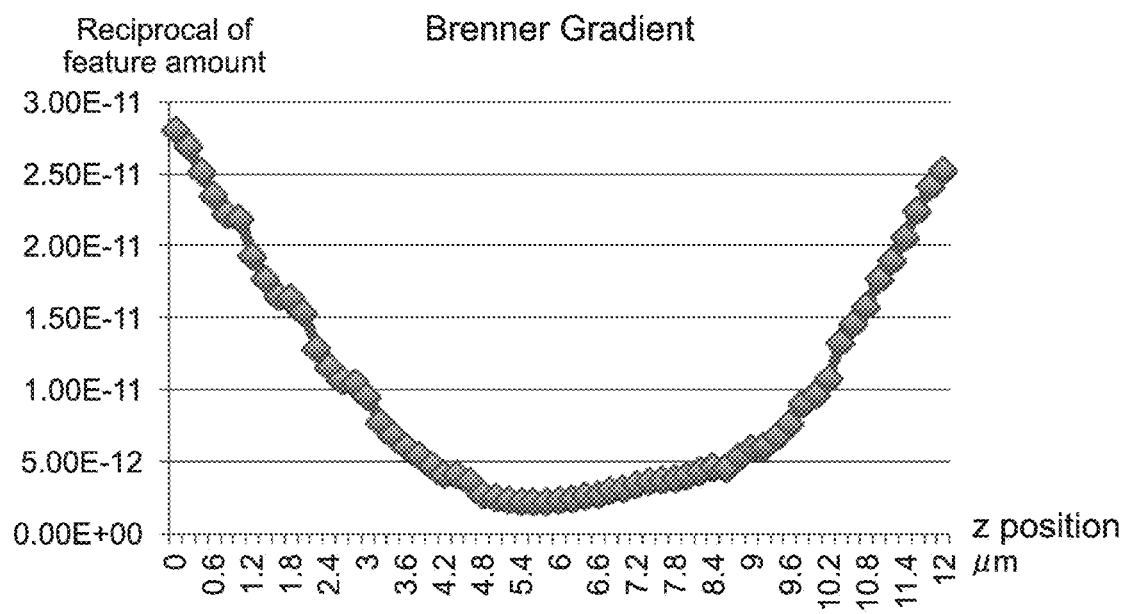
FIG. 23 is a diagram for the small area shown in FIG. 22, in which reciprocals of feature amounts of a plurality of images taken in a Z direction are plotted based on photographing positions, the feature amounts being obtained by a system in related art.

FIG. 23 is a diagram for the small area shown in FIG. 22, in which reciprocals of feature amounts of a plurality of images taken in the Z direction are plotted based on photographing positions, the feature amounts being obtained by the system in related art.

Figure 24:
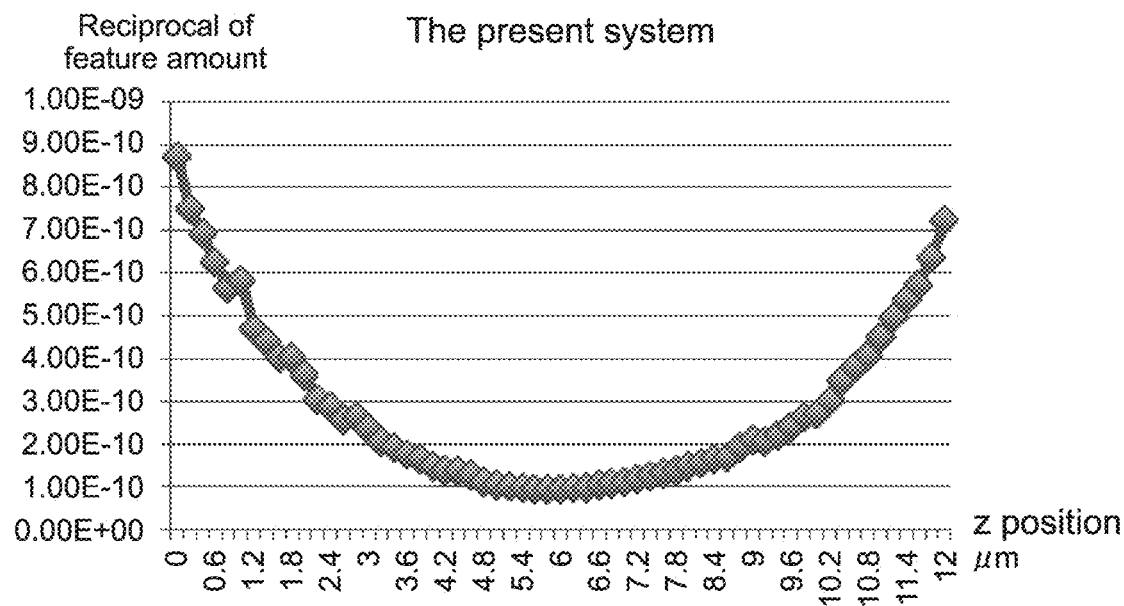
FIG. 24 is a diagram for the small area shown in FIG. 22, in which reciprocals of feature amounts of a plurality of images taken in the Z direction are plotted based on the photographing positions, the feature amounts being obtained by the present system.

FIG. 24 is a diagram for the small area shown in FIG. 22, in which reciprocals of feature amounts of a plurality of images taken in the Z direction are plotted based on photographing positions, the feature amounts being obtained by the present system.

From those diagrams, it is found that the plots in related art form a rough curve, whereas the plots in the present system form a smooth quadratic curve. This difference in shape has a large influence on the result of the fitting.

Next, variations in in-focus position calculated by the fitting will be described.

Figure 25:
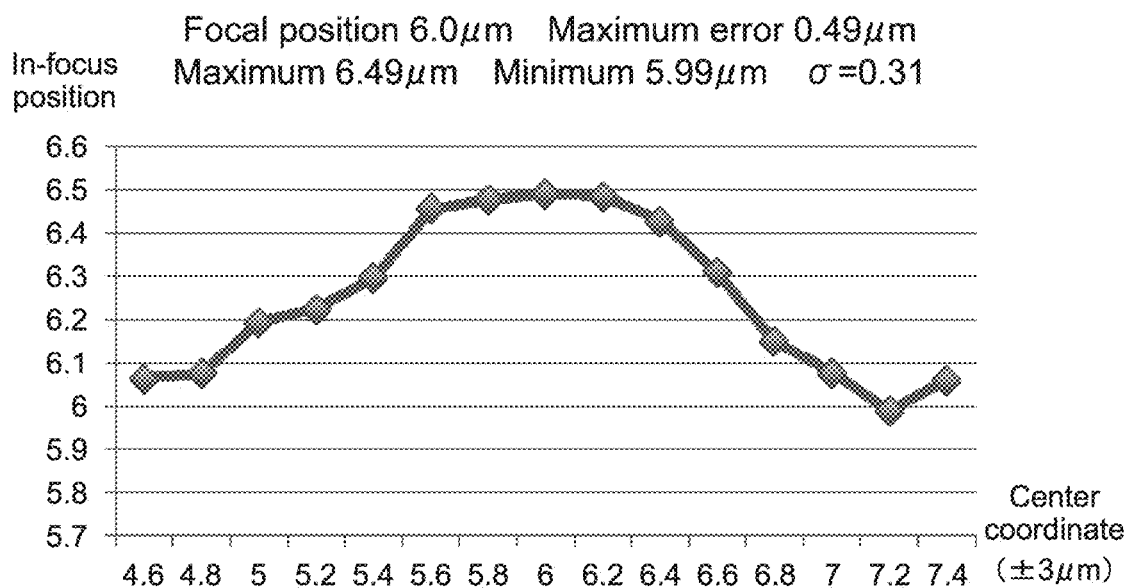
FIG. 25 is a graph of the in-focus position by the system in related art, which is obtained by performing curve fitting based on a curve plotted in FIG. 23.

FIG. 25 is a graph of the in-focus position by the system in related art, which is obtained by performing curve fitting based on the curve plotted in FIG. 23.

Figure 26:
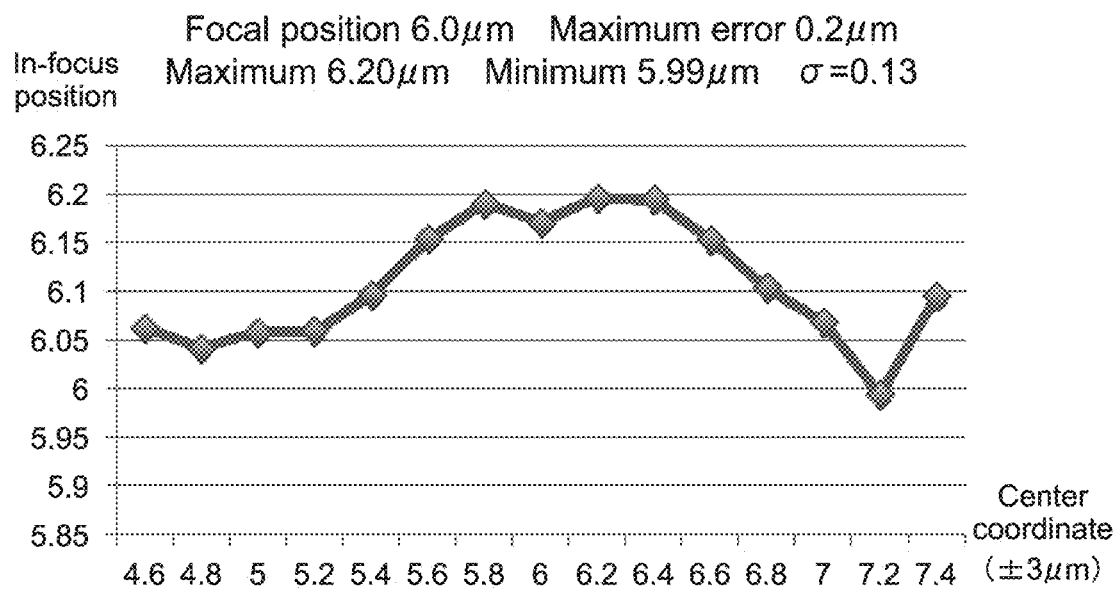
FIG. 26 is a graph of the in-focus position by the present system, which is obtained by performing curve fitting based on a curve plotted in FIG. 24.

FIG. 26 is a graph of the in-focus position by the present system, which is obtained by performing curve fitting based on the curve plotted in FIG. 24.

In the figures, σ represents a small amount of variations in in-focus position. In the system in related art, variations frequently occur and σ=0.31, whereas in the present system, σ=0.13, which is a good result. This means that variations in in-focus position less occur when the fitting is performed at any three points in the search by the contrast AF system. On the other hand, in the system in related art, calculated values of the in-focus positions vary due to the three Z positions selected for search. This results in outstanding defocusing at boundaries at which the images are bonded, when images are separately taken and combined.

Further, the maximum error is 0.49 μm in the system in related art, whereas it is 0.2 μm in the present system. The present system shows higher performance.

Additionally, results verified for the two images are shown in FIGS. 28 to 31, and 33 to 36.

Figure 27:
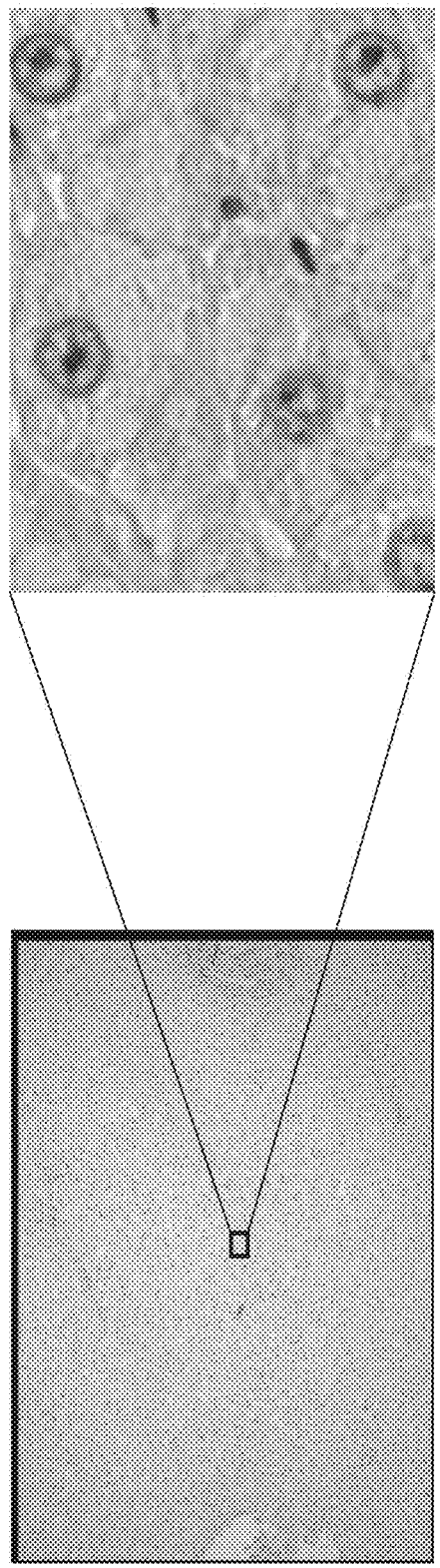
FIG. 27 is a diagram showing another image used in the specific examples of the curve fitting and a partially-enlarged small area of the image.

FIG. 27 is a diagram showing another image and a partially-enlarged small area of the image.

Figure 28:
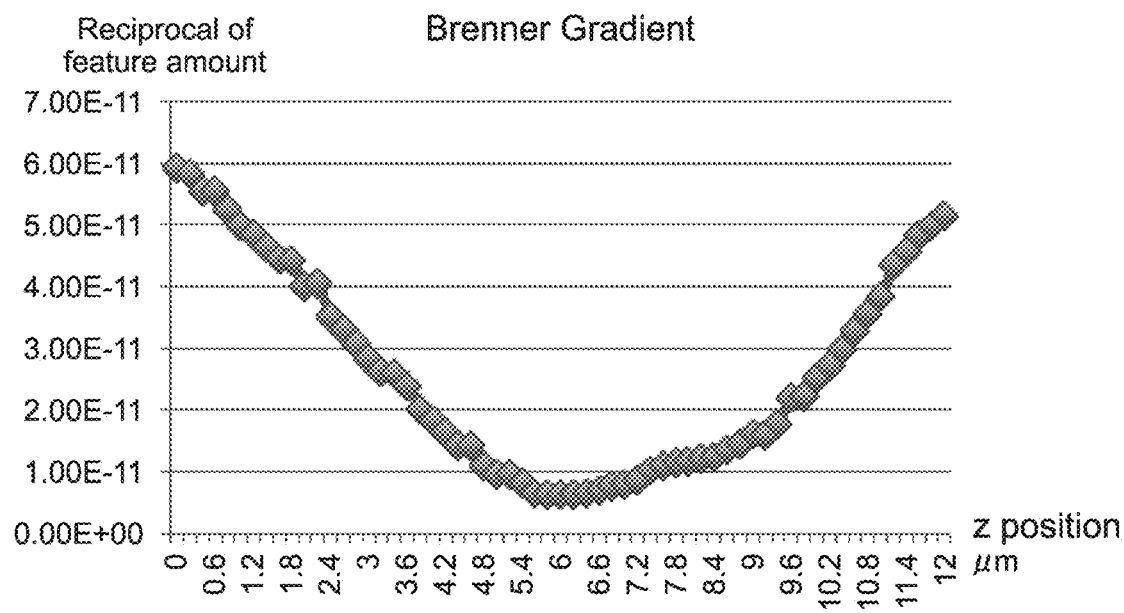
FIG. 28 is a diagram for the small area shown in FIG. 27, in which reciprocals of feature amounts of a plurality of images taken in the Z direction are plotted based on photographing positions, the feature amounts being obtained by the system in related art.

FIG. 28 is a diagram for the small area shown in FIG. 27, in which reciprocals of feature amounts of a plurality of images taken in the Z direction are plotted based on photographing positions, the feature amounts being obtained by the system in related art.

Figure 29:
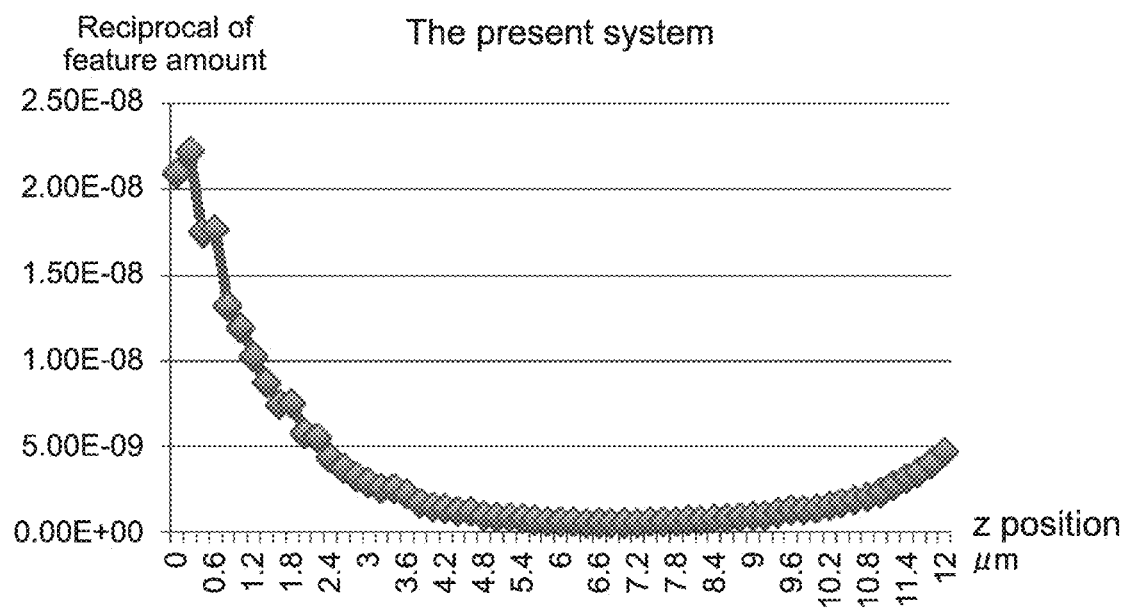
FIG. 29 is a diagram for the small area shown in FIG. 27, in which reciprocals of feature amounts of a plurality of images taken in the Z direction are plotted based on photographing positions, the feature amounts being obtained by the present system.

FIG. 29 is a diagram for the small area shown in FIG. 27, in which reciprocals of feature amounts of a plurality of images taken in the Z direction are plotted based on photographing positions, the feature amounts being obtained by the present system.

Figure 30:
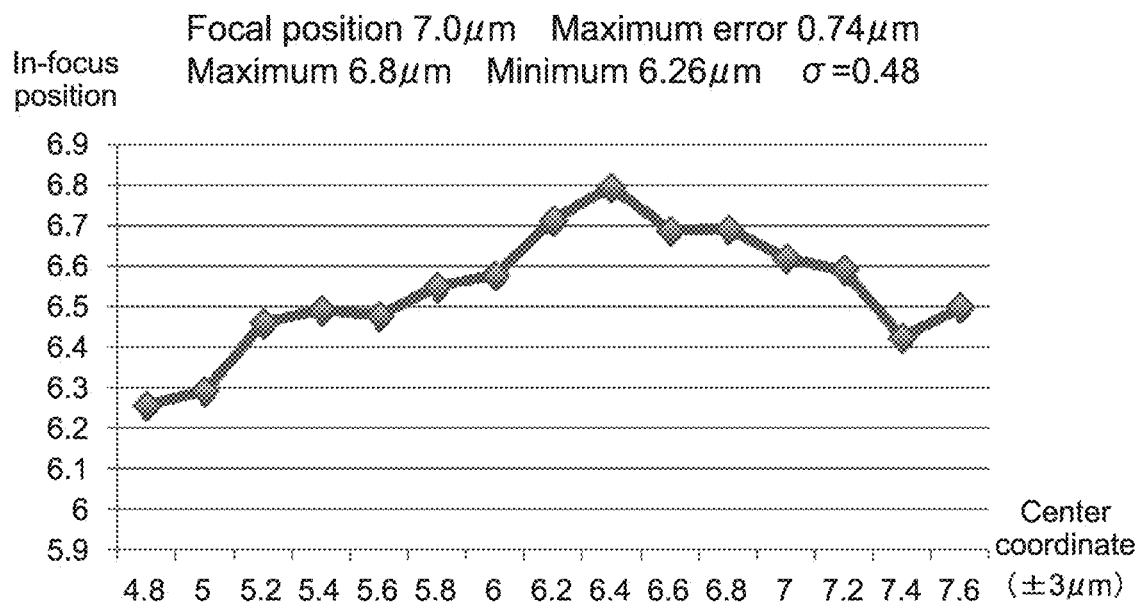
FIG. 30 is a graph of the in-focus position by the system in related art, which is obtained by performing curve fitting based on a curve plotted in FIG. 28.

FIG. 30 is a graph of the in-focus position by the system in related art, which is obtained by performing curve fitting based on the curve plotted in FIG. 28.

Figure 31:
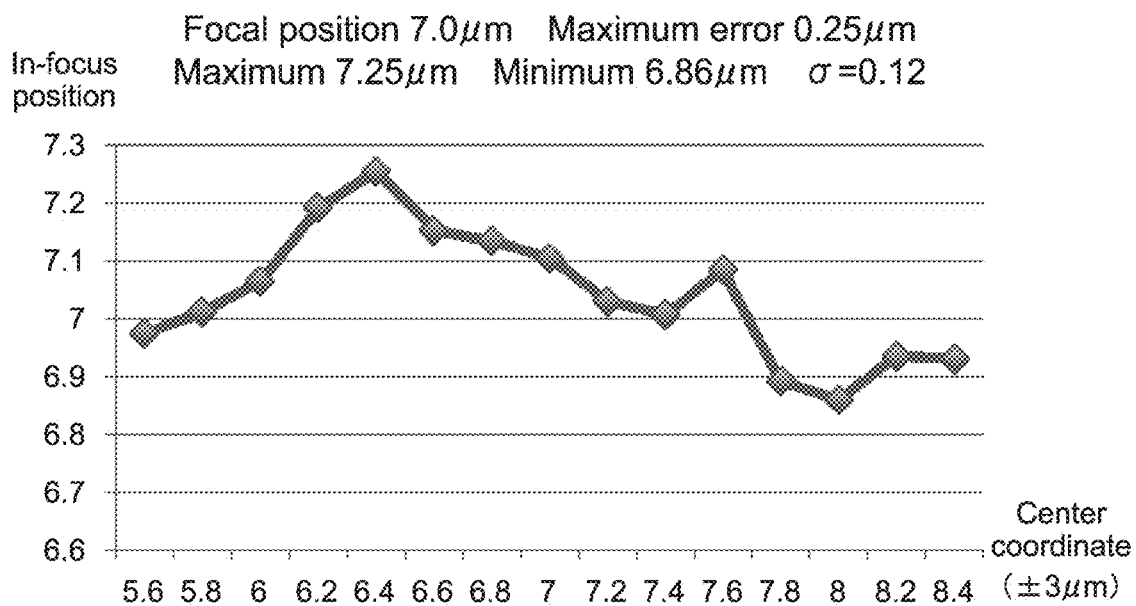
FIG. 31 is a graph of the in-focus position by the present system, which is obtained by performing curve fitting based on a curve plotted in FIG. 29.

FIG. 31 is a graph of the in-focus position by the present system, which is obtained by performing curve fitting based on the curve plotted in FIG. 29.

Figure 32:
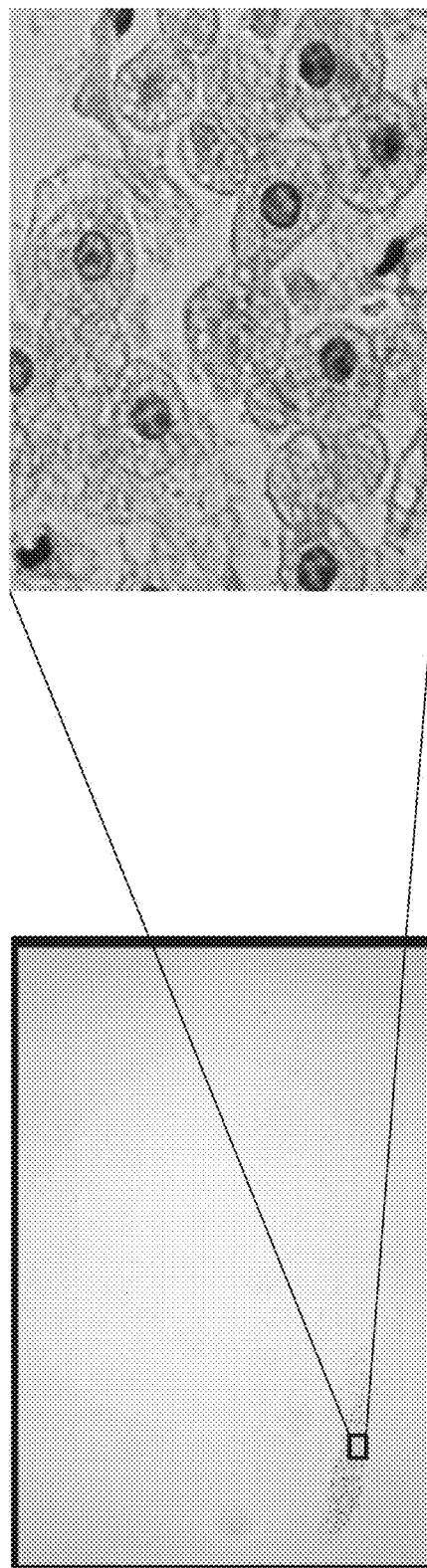
FIG. 32 is a diagram showing still another image used in the specific examples of the curve fitting and a partially-enlarged small area of the image.

FIG. 32 is a diagram showing still another image and a partially-enlarged small area of the image.

Figure 33:
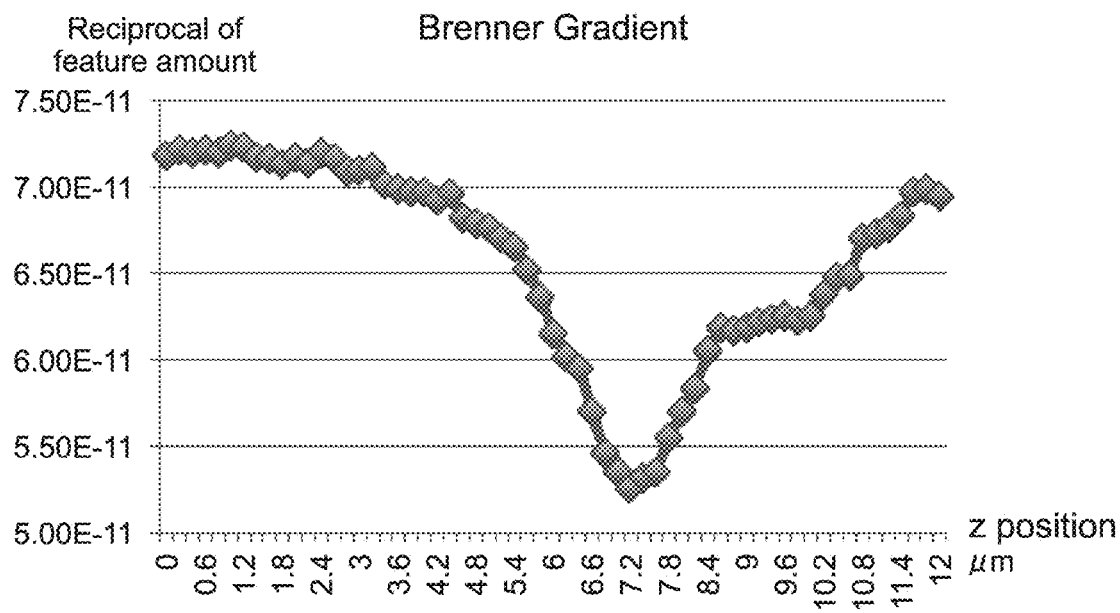
FIG. 33 is a diagram for the small area shown in FIG. 32, in which reciprocals of feature amounts of a plurality of images taken in the Z direction are plotted based on photographing positions, the feature amounts being obtained by the system in related art.

FIG. 33 is a diagram for the small area shown in FIG. 32, in which reciprocals of feature amounts of a plurality of images taken in the Z direction are plotted based on photographing positions, the feature amounts being obtained by the system in related art.

Figure 34:
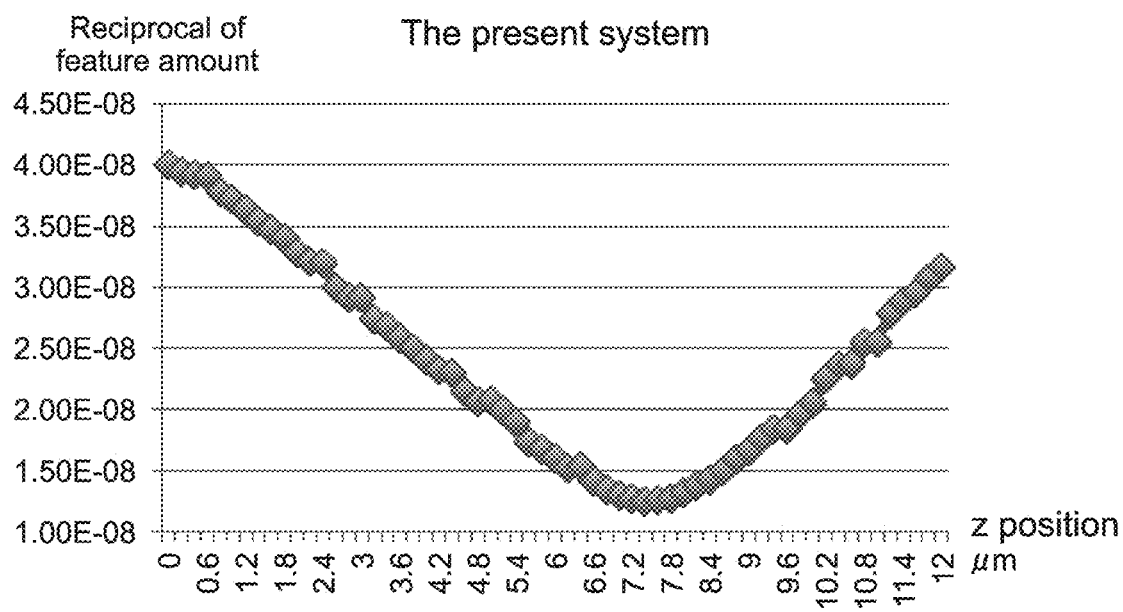
FIG. 34 is a diagram for the small area shown in FIG. 32, in which reciprocals of feature amounts of a plurality of images taken in the Z direction are plotted based on photographing positions, the feature amounts being obtained by the present system.

FIG. 34 is a diagram for the small area shown in FIG. 32, in which reciprocals of feature amounts of a plurality of images taken in the Z direction are plotted based on photographing positions, the feature amounts being obtained by the present system.

Figure 35:
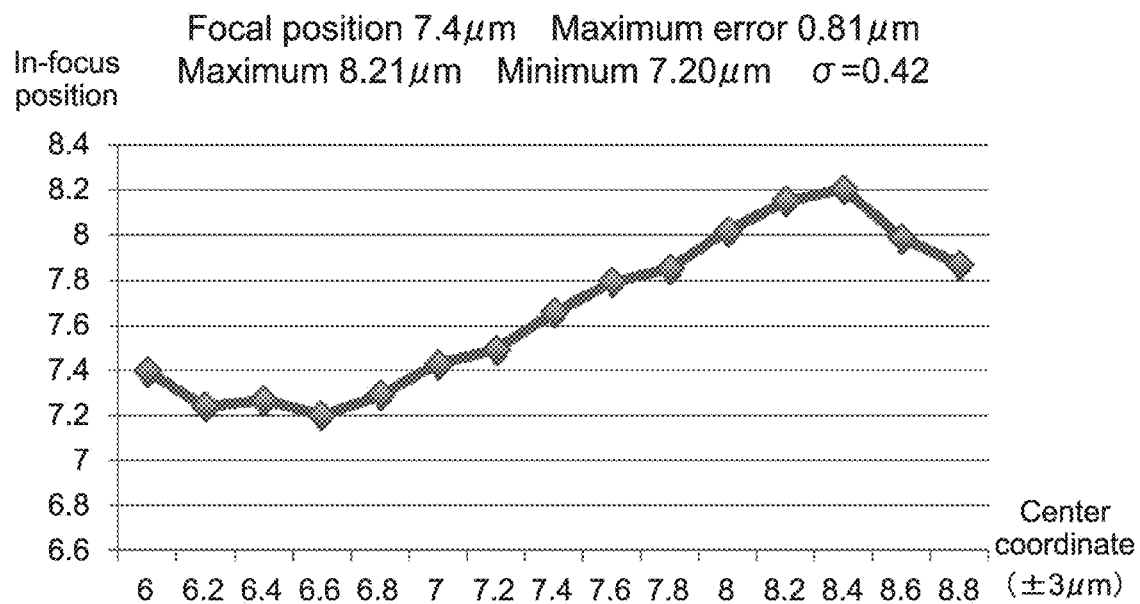
FIG. 35 is a graph of the in-focus position by the system in related art, which is obtained by performing curve fitting based on a curve plotted in FIG. 33.

FIG. 35 is a graph of the in-focus position by the system in related art, which is obtained by performing curve fitting based on the curve plotted in FIG. 33.

Figure 36:
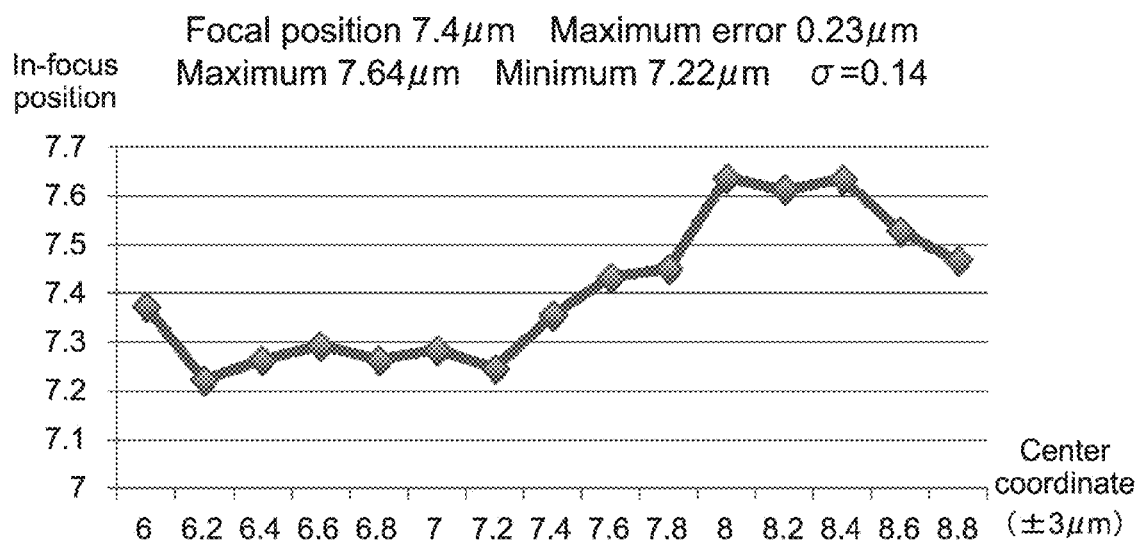
FIG. 36 is a graph of the in-focus position by the present system, which is obtained by performing curve fitting based on a curve plotted in FIG. 34.

FIG. 36 is a graph of the in-focus position by the present system, which is obtained by performing curve fitting based on the curve plotted in FIG. 34.

[Another Configuration of the Present Technology]

It should be noted that the present technology can take the following configurations.

(1) An information processing apparatus, including:

a search image acquisition unit that acquires enlarged images at focal positions different from each other;

a first feature amount calculation unit that obtains, for each of the multiple captured enlarged images, a first feature amount based on a direct current component and a dynamic range of an alternating current component of pixel values for each of blocks forming each of the enlarged images; and an in-focus position determination unit that determines an in-focus position of each enlarged image based on the first feature amount.

(2) The information processing apparatus according to (1), in which the first feature amount calculation unit obtains the first feature amount in accordance with the block that satisfies a first condition in which the dynamic range of the alternating current component is predetermined and a second condition in which the direct current component is predetermined.

(3) The information processing apparatus according to (2), in which the first feature amount calculation unit calculates and combines a unit feature amount of the block that satisfies the first condition and the second condition by a predetermined method, and obtains a first feature amount of each of the enlarged images based on a result of the combination.

(4) The information processing apparatus according to any one of (1) to (3), further including a curve fitting unit that performs curve fitting on a predetermined curve based on a combination of reciprocals of the first feature amounts at three or more focal positions and calculates a focal position at which the reciprocal becomes minimum on the predetermined curve, in which the in-focus position determination unit sets the focal position calculated by the curve fitting unit as an in-focus position.

(5) The information processing apparatus according to (4), in which the predetermined curve is a quadratic curve.

(6) The information processing apparatus according to any one of (1) to (5), in which the first feature amount calculation unit calculates the first feature amount based on a minimum value and a difference value between a maximum value and the minimum value of pixel values of each block.

(7) The information processing apparatus according to (3), in which the first feature amount calculation unit uses the dynamic range as the unit feature amount.

(8) The information processing apparatus according to (3), in which the first feature amount calculation unit uses a Brenner Gradient as the unit feature amount.

(9) The information processing apparatus according to any one of (1) to (8), in which the search image acquisition unit acquires rough-search enlarged images at three or more focal positions that are separated from one another by a first interval for roughly searching for an in-focus position, the first feature amount calculation unit obtains the first feature amount for each of the rough-search enlarged images, the in-focus position determination unit obtains an in-focus position for rough search, the search image acquisition unit acquires fine-search enlarged images at three or more focal positions that are separated from one another by a second interval for finely searching for an in-focus position with the in-focus position for rough search being set as the center, the second interval being narrower than the first interval, the first feature amount calculation unit obtains the first feature amount for each of the fine-search enlarged images, and the in-focus position determination unit obtains an in-focus position for fine search and sets the in-focus position for fine search as a final in-focus position.

(10) The information processing apparatus according to any one of (1) to (8), in which the search image acquisition unit acquires the enlarged images at three or more focal positions different from one another, the first feature amount calculation unit partitions each of the multiple acquired enlarged images into m×n first areas, m and n being integers of 2 or more, and obtains the first feature amount for each of the first areas, and the in-focus position determination unit obtains an in-focus position for each of the first areas, obtains a tilt of the sample from the in-focus position for each of the areas, and selects a final in-focus position based on the tilt.

(11) The information processing apparatus according to any one of (1) to (10), in which when the result of the combination is smaller than a predetermined value, a Brenner Gradient of each of the enlarged images is obtained and added to the result of the combination, to obtain the first feature amount.

(12) The information processing apparatus according to any one of (1) to (8), further including a phase difference autofocusing (AF) processing unit that causes a phase difference AF detection unit to detect a phase difference in-focus position, the phase difference AF detection unit detecting an in-focus position by a phase difference AF system, in which the search image acquisition unit acquires the enlarged images at three or more focal positions different from one another, the phase difference in-focus position being located among the three or more focal positions.

(13) The information processing apparatus according to (12), in which the in-focus position determination unit sets the phase difference in-focus position as a final in-focus position, when at least one of that the first feature amount at the phase difference in-focus position is the maximum and that a reciprocal of the first feature amount at the focal position satisfies a predetermined relationship is satisfied.

(14) The information processing apparatus according to (2), further including:

a phase difference AF processing unit that causes a phase difference AF detection unit to detect a phase difference in-focus position, the phase difference AF detection unit detecting an in-focus position by a phase difference AF system; and an enlarged image capturing unit that captures enlarged images of multiples small areas that partition an area including a sample on a glass slide, in which the search image acquisition unit acquires rough-search enlarged images at three or more focal positions that are separated from one another by a first interval for roughly searching for an in-focus position, in a first small area of the multiples small areas, the first feature amount calculation unit obtains the first feature amount for each of the rough-search enlarged images, the in-focus position determination unit obtains an in-focus position for rough search, the search image acquisition unit acquires fine-search enlarged images at three or more focal positions that are separated from one another by a second interval for finely searching for an in-focus position with the in-focus position for rough search being set as the center, the second interval being narrower than the first interval, the first feature amount calculation unit obtains the first feature amount for each of the fine-search enlarged images, the in-focus position determination unit obtains an in-focus position for fine search and sets the in-focus position for fine search as a final in-focus position, the phase difference AF processing unit calculates the phase difference in-focus position of each of second small areas, the second small areas being one or more small areas included in the multiple small areas excluding the first small area, the search image acquisition unit acquires the enlarged images at three or more focal positions different from one another, the phase difference in-focus position being located among the three or more focal positions, the first feature amount calculation unit obtains the first feature amount for each of the enlarged images, and the in-focus position determination unit sets the phase difference in-focus position as a final in-focus position, when at least one of that the first feature amount at the phase difference in-focus position is the maximum and that the focal position and a reciprocal of the first feature amount satisfy a predetermined relationship is satisfied.

(15) The information processing apparatus according to (14), in which the first feature amount calculation unit sets, when the first feature amount for each of the rough-search enlarged images is obtained, the first condition in which the first feature amount exceeds a square root value of the maximum value that is output by the enlarged image capturing unit.

(16) An information processing apparatus, including:
a search image acquisition unit that acquires enlarged images at focal positions different from each other;
a second feature amount calculation unit that
partitions each of the enlarged images into p×q second areas, p and q being predetermined positive integers,
obtains, for each of the second areas, a direct current component and a dynamic range of an alternating current component of pixel values for each of blocks forming the second area,
counts blocks that satisfy a first condition in which the dynamic range of the alternating current component is predetermined and a second condition in which the direct current component is predetermined, and
obtains a result of the count as a second feature amount for each of the second areas; and
a white image determination unit that determines the enlarged image as a white image in which a sample does not appear, if there is no second feature amount exceeding a predetermined value in the obtained second feature amounts.

(17) An information processing apparatus, including:
a search image acquisition unit that acquires enlarged images at focal positions different from each other;
an enlarged image capturing unit that captures enlarged images of multiples small areas that partition an area including a sample on a glass slide;
a second feature amount calculation unit that
partitions a peripheral part of each of the enlarged images into p second areas, p being a predetermined integer of 2 or more,
obtains, for each of the second areas, a direct current component and a dynamic range of an alternating current component of pixel values for each of blocks forming the second area,
counts blocks that satisfy a first condition in which the dynamic range of the alternating current component is predetermined and a second condition in which the direct current component is predetermined, and
obtains a result of the count as a second feature amount for each of the second areas; and
a continuation determination unit that determines the enlarged image of a different small area adjacent to the second area as an image in which the sample appears, when the obtained second feature amount exceeds a predetermined value.

(18) An information processing method, including:
acquiring, by a search image acquisition unit, enlarged images at focal positions different from each other;
obtaining, by a first feature amount calculation unit, for each of the multiple captured enlarged images, a first feature amount based on a direct current component and a dynamic range of an alternating current component of pixel values for each of blocks forming each of the enlarged images; and
determining, by an in-focus position determination unit, an in-focus position of each enlarged image based on the first feature amount.

(19) An information processing program causing a computer to function as:
a search image acquisition unit that acquires enlarged images at focal positions different from each other;
a first feature amount calculation unit that obtains, for each of the multiple captured enlarged images, a first feature amount based on a direct current component and a dynamic range of an alternating current component of pixel values for each of blocks forming each of the enlarged images; and
an in-focus position determination unit that determines an in-focus position of each enlarged image based on the first feature amount.

[Supplementary Note]

In addition, the present technology is not limited to the embodiments described above and can be variously modified as a matter of course without departing from the gist of the present technology.

DESCRIPTION OF REFERENCE NUMERALS 10 overhead image capturing unit
11 light source
12 objective lens
13 imaging device
20 enlarged image capturing unit
21 light source
22 condenser lens
23 objective lens
24 imaging device
25 condenser lens drive mechanism
30 defocus amount detection unit
31 beam splitter
32 field lens
33 separator lens
34 imaging device
40 stage
41 stage drive mechanism
50 control unit
51 integration control unit
511 area detection unit
512 phase difference AF in-focus position calculation unit
513 contrast AF in-focus position calculation unit
514 first feature amount calculation unit
515 curve fitting processing unit
516 white image determination unit
517 second feature amount calculation unit
518 continuation determination unit
519 in-focus position acceptance/rejection determination unit
52 illumination control unit
53 stage control unit
54 condenser lens drive control unit
55 phase difference image capturing control unit
56 overhead image capturing control unit
57 enlarged image capturing control unit
58 storage unit
59 development processing unit
60 image coding unit
70 preparation stock loader
100 digital microscope apparatus
PRT preparation
SPL biological sample

The invention claimed is:
1. An information processing apparatus, comprising:
processing circuitry configured to:
acquire enlarged images at focal positions different from each other;
obtain, for each of the multiple captured enlarged images, a first feature amount based on a direct current component and a dynamic range of an alternating current component of pixel values for each of blocks forming each of the enlarged images;
determine an in-focus position of each enlarged image based on the first feature amount;

partition each of the enlarged images into p×q second areas, p and q being predetermined positive integers;

obtain, for each of the second areas, a direct current component and a dynamic range of an alternating current component of pixel values for each of blocks forming the second area;

count blocks that satisfy a first condition in which the dynamic range of the alternating current component is predetermined and a second condition in which the direct current component is predetermined;

obtain a result of the count as a second feature amount for each of the second areas; and determine the enlarged image as a white image in which a sample does not appear, if there is no second feature amount exceeding a predetermined value in the obtained second feature amounts.

2. The information processing apparatus according to claim 1, wherein
the processing circuitry is configured to obtain the first feature amount in accordance with the block that satisfies a first condition in which the dynamic range of the alternating current component is predetermined and a second condition in which the direct current component is predetermined.

3. The information processing apparatus according to claim 2, wherein
the processing circuitry is configured to calculate and combine a unit feature amount of the block that satisfies the first condition and the second condition by a predetermined method, and obtain a first feature amount of each of the enlarged images based on a result of a combination of the unit feature amounts.

4. The information processing apparatus according to claim 3,
wherein the processing circuitry is further configured to perform curve fitting on a predetermined curve based on a combination of reciprocals of the first feature amounts at three or more focal positions and calculate a focal position at which the reciprocal becomes minimum on the predetermined curve, wherein
the focal position unit is set as an in-focus position.

5. The information processing apparatus according to claim 4, wherein
the predetermined curve is a quadratic curve.

6. The information processing apparatus according to claim 3, wherein
the processing circuitry is configured to calculate the first feature amount based on a minimum value and a difference value between a maximum value and the minimum value of pixel values of each block.

7. The information processing apparatus according to claim 3, wherein
the processing circuitry is configured to use the dynamic range as the unit feature amount.

8. The information processing apparatus according to claim 3, wherein
the processing circuitry is configured to use a Brenner Gradient as the unit feature amount.

9. The information processing apparatus according to claim 1, wherein the processing circuitry is configured to:
acquire rough-search enlarged images at three or more focal positions that are separated from one another by a first interval for roughly searching for an in-focus position,
obtain the first feature amount for each of the rough-search enlarged images,
obtain an in-focus position for rough search,
acquire fine-search enlarged images at three or more focal positions that are separated from one another by a second interval for finely searching for an in-focus position with the in-focus position for rough search being set as the center, the second interval being narrower than the first interval,
obtain the first feature amount for each of the fine-search enlarged images, and
obtain an in-focus position for fine search and set the in-focus position for fine search as a final in-focus position.

10. The information processing apparatus according to claim 1, wherein the processing circuitry is configured to:
acquire the enlarged images at three or more focal positions different from one another,
partition each of the multiple acquired enlarged images into m×n first areas, m and n being integers of 2 or more, and obtain the first feature amount for each of the first areas, and
obtain an in-focus position for each of the first areas, obtain a tilt of the sample from the in-focus position for each of the areas, and select a final in-focus position based on the tilt.

11. The information processing apparatus according to claim 3, wherein
the processing circuitry is configured to obtain, when the result of the combination is smaller than a predetermined value, a Brenner Gradient of each of the enlarged images and add the Brenner Gradient to the result of the combination, to obtain the first feature amount.

12. The information processing apparatus according to claim 1, wherein the processing circuitry is further configured to:
detect a phase difference in-focus position, and
acquire the enlarged images at three or more focal positions different from one another, the phase difference in-focus position being located among the three or more focal positions.

13. The information processing apparatus according to claim 12, wherein
the processing circuitry is configured to set the phase difference in-focus position as a final in-focus position, when at least one of the first feature amount at the phase difference in-focus position is a maximum and a reciprocal of the first feature amount at the focal position satisfies a predetermined relationship is satisfied.

14. An information processing apparatus, comprising:
processing circuitry configured to:
acquire enlarged images at focal positions different from each other;
obtain, for each of the multiple captured enlarged images, a first feature amount based on a direct current component and a dynamic range of an alternating current component of pixel values for each of blocks forming each of the enlarged images;
determine an in-focus position of each enlarged image based on the first feature amount;
obtain the first feature amount in accordance with the block that satisfies a first condition in which the dynamic range of the alternating current component is predetermined and a second condition in which the direct current component is predetermined;
detect a phase difference in-focus position,
acquire enlarged images of multiple small areas that partition an area including a sample on a glass slide, acquire rough-search enlarged images at three or more focal positions that are separated from one another by a first interval for roughly searching for an in-focus position, in a first small area of the multiple small areas,
obtain the first feature amount for each of the rough-search enlarged images,
obtain an in-focus position for rough search,
acquire fine-search enlarged images at three or more focal positions that are separated from one another by a second interval for finely searching for an in-focus position with the in-focus position for rough search being set as the center, the second interval being narrower than the first interval,
obtain the first feature amount for each of the fine-search enlarged images,
obtain an in-focus position for fine search and set the in-focus position for fine search as a final in-focus position,
calculate the phase difference in-focus position of each of second small areas, the second small areas being one or more small areas included in the multiple small areas excluding the first small area,
acquire the enlarged images at three or more focal positions different from one another, the phase difference in-focus position being located among the three or more focal positions,
obtain the first feature amount for each of the enlarged images, and
set the phase difference in-focus position as a final in-focus position, when at least one of the first feature amount at the phase difference in-focus position is a maximum and the focal position and a reciprocal of the first feature amount satisfy a predetermined relationship is satisfied.

15. An information processing apparatus, comprising:
processing circuitry configured to:
acquire enlarged images at focal positions different from each other;
obtain, for each of the multiple captured enlarged images, a first feature amount based on a direct current component and a dynamic range of an alternating current component of pixel values for each of blocks forming each of the enlarged images;
determine an in-focus position of each enlarged image based on the first feature amount;
acquire enlarged images of multiple small areas that partition an area including a sample on a glass slide;
partition a peripheral part of each of the enlarged images into p second areas, p being a predetermined integer of 2 or more,
obtain, for each of the second areas, a direct current component and a dynamic range of an alternating current component of pixel values for each of blocks forming the second area,
count blocks that satisfy a first condition in which the dynamic range of the alternating current component is predetermined and a second condition in which the direct current component is predetermined,
obtain a result of the count as a second feature amount for each of the second areas; and
determine the enlarged image of a different small area adjacent to the second area as an image in which the sample appears, when the obtained second feature amount exceeds a predetermined value.

16. An information processing method, comprising:
acquiring enlarged images at focal positions different from each other;
obtaining for each of the multiple captured enlarged images, a first feature amount based on a direct current component and a dynamic range of an alternating current component of pixel values for each of blocks forming each of the enlarged images;
determining an in-focus position of each enlarged image based on the first feature amount;
partitioning each of the enlarged images into p×q second areas, p and q being predetermined positive integers;
obtaining, for each of the second areas, a direct current component and a dynamic range of an alternating current component of pixel values for each of blocks forming the second area;
counting blocks that satisfy a first condition in which the dynamic range of the alternating current component is predetermined and a second condition in which the direct current component is predetermined;
obtaining a result of the count as a second feature amount for each of the second areas; and
determining the enlarged image as a white image in which a sample does not appear, if there is no second feature amount exceeding a predetermined value in the obtained second feature amounts.

17. A non-transitory computer readable medium storing instructions that, when executed by a computer, perform an information processing method comprising:
acquiring enlarged images at focal positions different from each other;
obtaining, for each of the multiple captured enlarged images, a first feature amount based on a direct current component and a dynamic range of an alternating current component of pixel values for each of blocks forming each of the enlarged images;
determining an in-focus position of each enlarged image based on the first feature amount;
partitioning each of the enlarged images into p×q second areas, p and q being predetermined positive integers;
obtaining, for each of the second areas, a direct current component and a dynamic range of an alternating current component of pixel values for each of blocks forming the second area;
counting blocks that satisfy a first condition in which the dynamic range of the alternating current component is predetermined and a second condition in which the direct current component is predetermined;
obtaining a result of the count as a second feature amount for each of the second areas; and
determining the enlarged image as a white image in which a sample does not appear, if there is no second feature amount exceeding a predetermined value in the obtained second feature amounts.

\* \* \* \* \*